US006707889B1

(12) United States Patent
Saylor et al.

(10) Patent No.: US 6,707,889 B1
(45) Date of Patent: Mar. 16, 2004

(54) MULTIPLE VOICE NETWORK ACCESS PROVIDER SYSTEM AND METHOD

(75) Inventors: Michael J. Saylor, Vienna, VA (US); Stephen S. Trundle, Falls Church, VA (US); Anurag Patnaik, Arlington, VA (US); David A. Garr, Washington, DC (US); Benjamin M. Lindsey, Fairfax, VA (US); Josh Mahowald, Washington, DC (US); Zeynep Inanoglu, Arlington, VA (US)

(73) Assignee: Microstrategy Incorporated, McLean, VA (US)

( * ) Notice: Subject to any disclaimer, the term of this patent is extended or adjusted under 35 U.S.C. 154(b) by 0 days.

(21) Appl. No.: 09/480,665

(22) Filed: Jan. 11, 2000

Related U.S. Application Data

(60) Provisional application No. 60/150,602, filed on Aug. 26, 1999, and provisional application No. 60/150,354, filed on Aug. 24, 1999.

(51) Int. Cl.[7] .................................................. H04M 1/64
(52) U.S. Cl. ................................ 379/88.04; 379/88.17; 379/88.25; 704/275
(58) Field of Search .......................... 379/88.01, 88.02, 379/88.03, 88.04, 88.13, 88.14, 88.16, 88.17, 88.18, 88.22–88.25, 88.27, 88.28; 707/513–515; 345/700, 760; 717/100, 114; 704/270–273, 270.1, 275

(56) References Cited

U.S. PATENT DOCUMENTS

| 4,059,732 A | 11/1977 | Hayden et al. |
| 4,355,207 A | 10/1982 | Curtin |
| 4,742,516 A | 5/1988 | Yamaguchi |
| 4,761,807 A | 8/1988 | Matthews et al. |
| 4,932,021 A | 6/1990 | Moody |

(List continued on next page.)

OTHER PUBLICATIONS

Harry Newton, Neton's Telecom Dictionary, Mar. 1998, Flatiron Publishing, 14th Ed., ISBN 1–57820–023–7, P. 814.*
Lisa Ammerman, Voice Portals Promise a Hands–Free Internet Future, Feb. 2001.
*Wireless Week*, Brad Smith, "Need An Answer? Just Ask," Jun. 25, 2000, p. 38.

*Primary Examiner*—Roland G. Foster
(74) *Attorney, Agent, or Firm*—Hunton & Williams LLP

(57) ABSTRACT

A system and method in which multiple voice network access provider ("VNAP") systems cooperate to enable output of voice pages based on input of a voice code ("VCodes") assigned to the voice pages. Each multiple voice network access provider enables user to access content corresponding to the VCodes publicly displayed in proximity to an object, attraction or subject, by calling a central number for that VNAP and entering the VCode or verbally describing the object, attraction or subject, in which case the verbal description is associated with a VCode or collection of VCodes.

29 Claims, 19 Drawing Sheets

U.S. PATENT DOCUMENTS

| | | |
|---|---|---|
| 5,134,647 A | 7/1992 | Pugh et al. |
| 5,216,603 A | 6/1993 | Flores et al. |
| 5,243,643 A | 9/1993 | Sattar et al. |
| 5,251,251 A | 10/1993 | Barber et al. |
| 5,283,731 A | 2/1994 | Lalonde et al. |
| 5,687,220 A | 11/1997 | Finnigan |
| 5,825,856 A | 10/1998 | Porter et al. |
| 5,828,732 A | 10/1998 | Gow |
| 5,838,906 A | 11/1998 | Doyle et al. |
| 5,884,262 A | 3/1999 | Wise et al. |
| 5,901,214 A | 5/1999 | Shaffer et al. |
| 5,915,001 A | 6/1999 | Uppaluru |
| 5,923,736 A | 7/1999 | Shachar |
| 5,924,070 A | 7/1999 | Ittycheriah et al. |
| 5,926,526 A | 7/1999 | Rapaport et al. |
| 5,937,390 A | 8/1999 | Hyodo |
| 5,945,989 A | 8/1999 | Freishtat et al. |
| 5,963,626 A | 10/1999 | Nabkel |
| 6,081,782 A | 6/2000 | Rabin |
| 6,230,132 B1 * | 5/2001 | Class et al. .................. 704/270 |
| 6,243,445 B1 * | 6/2001 | Begeja et al. ............. 379/93.01 |
| 6,501,832 B1 * | 12/2002 | Saylor et al. ............. 379/88.04 |

* cited by examiner

FIG. 10B

MULTIPLE VOICE NETWORK ACCESS PROVIDER SYSTEM AND METHOD

RELATED APPLICATIONS

This application claims priority to U.S. Provisional Patent Application Nos. 60/150,354 and 60/150,602 filed on Aug. 24, 1999 and Aug. 26, 1999, respectively both having the title "Voice Network Access Provider System and Method."

This application references a computer program listing Appendix submitted on two identical compact discs which are incorporated by reference, the file entitled "Appendix A—Telecaster Markup Language (TML) Tutorial", occupying 8,411 KB and recorded on May 5, 2003, herein in its entirety.

FIELD OF THE INVENTION

This invention relates to a system and method in which multiple voice network access provider ("VNAP") systems cooperate to enable output of voice pages based on input of a voice code ("VCodes") assigned to the voice pages. Each multiple voice network access provider enables user to access content corresponding to the VCodes publicly displayed in proximity to an object, attraction or subject, by calling a central number for that VNAP and entering the VCode or verbally describing the object, attraction or subject, in which case the verbal description is associated with a VCode or collection of VCodes.

BACKGROUND OF THE INVENTION

Information is most useful when it is delivered to the right person at the right time. Delivery of the right information to the right person has been a problem that many businesses have attempted to solve over the years. Indeed, an entire industry of decision support technology exists to deliver information to members of a business based on massive amounts of data collected about the businesses. The World Wide Web and the Internet have provided an avenue for information delivery, but current Web-based systems still fail to adequately deliver the right information at the right time. One of the major problems with the World Wide Web is the requirement to utilize a computer and web-browser to access its contents. Although penetration of computers throughout the world has increased, that penetration is far from making information readily available to everyone wherever they happen to be.

Moreover, most computer users connect to the Web through a land line. Most users therefore do not have access to Web content when they are away from a land line. Although technology is being developed to enable World Wide Web access through other mediums, such as web-enabled personal digital assistants, for example, such technology require users to purchase new equipment to access this technology. Given the sparse penetration of personal digital assistants already, this technology does not satisfy the need for delivery of timely information.

Therefore, existing systems do not provide a readily available medium for delivery of the right information at the right time or a system for delivering that information. These and other drawbacks exist with current systems.

SUMMARY OF THE INVENTION

One aspect of the invention relates to creating a novel VCode registration system. A VCode is a code that may be assigned to a particular "page" of content that can be delivered to a user via phone or other delivery device, preferably to enable the user to hear the content. A user may access the content corresponding to the VCode by entering the VCode through an interactive communications device, such as a land or mobile telephone. Also, VCodes may be input through verbal descriptions which are then associated with the desired VCode and corresponding pages or pages of content. A voice-to-text, natural language engine, and/or best fit correspondence engine may be used to interpret verbal descriptions to determine which VCode and corresponding page of content to generate for the user.

These pages of content corresponding to the VCodes are referred to herein as VPages. A VPage can consist of any grouping of content that is stored at a single location. A VPage contains both voice content and a means of structuring it. Voice content may be stored in any format. One possible format is an audio file. Another is a text file, the content of which may be subsequently converted to audio via a text to speech (TTS) engine. A VPage may reference content stored in other locations. In one implementation, VPages may be stored as files on a server's filesystem. In another, they may be records in a database. In one implementation, they may be stored in an XML-based format such as TML (see computer program listing Appendix) or VoiceXML.

VCodes may also be assigned to collections of related VPages. These collections of one or more VPages are referred to herein as VBooks. Each VPage or VBook is stored on a particular server. If multiple servers are used, each server may be assigned a VCode portion to identify the server. If servers are located in different locations or are operated by different voice network access providers, VNAPs, another VCode portion may be used to designate the server location. A VPage may contain other VCodes or other links that may be presented to a user to enable the user to link from an initial VPage to another. For example, the first page of a VBook may provide an indication of other VPages in that VBook that are accessible by entering the appropriate VCode (or other input). Also, when a user accesses one or more VPages, the VPage may provide a voice menu to a user with numbers associates with each menu item to enable a user to access other VPages (in that VBook or otherwise) or other choices. Also, the user may be permitted to use verbal commands to select options within a VPage. Again, voice-to-text, natural language, and best-fit modules may be used to interpret the user's verbal option request and act upon the request accordingly. According to another embodiment, a VPage or VBook may enable a user to be transferred to another VBook, another VNAP, or a VAdvertisement (as described below), among other things.

VCodes provide a means for addressing voice content. A VCode may be any data string that references unambiguously a single voice page. It can take on any of a number of forms. In one implementation, a VCode may be a string of DTMF values (values on a telephone keypad: 1,2,3, . . . 0,#,*). In another, a VCode may be a spoken word or series of words (an automatic speech recognition (ASR) engine may be used here to interpret user input). A VCode may be in any of a number of other formats, provided it unambiguously references a single VPage.

A VCode may be a simple numeric code or an alphanumeric code (including symbols such as # and *) or any other code that may be entered via a keypad of a phone or other interactive communications device or through voice recognition technology now or in the future. For example, but without limitation, the VCode may be a seven digit number. Each unique VCode corresponds to a VPage, a VBook, or in other embodiments, other levels of information relating to a VPage or VBook (e.g., where the VBook or VPage is stored, the "provider of the content," or other information). For example, different levels of sophistication may be used for a VCode.

A VCode may comprise of one or more fields. A VCode with more than one field will be referred to as a multi-level VCode. A multi-level scheme may be used to specify various aspects of the referenced VPage. For example, a VPage stored as a file on a file server may have a VCode with one field to specify host on which the VPage resides, another to specify its directory, and another to specify its name. The fields of such a multi-level VCode can take on any of a number of forms (DTMF, speech signals, etc.) and be concatenated using any of a number of schemes (in a multi-level DTMF VCode, the fields may be separated by a '*').

It should be noted that multiple VCodes in multiple formats may refer to the same VPage. Such a scheme may be used to allow a single page to be referenced by an easy-to-remember DTMF string (SMITHSONIAN*AIRSPACE# on the telephone keypad, e.g.), and easy-to-type DTMF string (149#), and an easy-to-say text string ("the Smithsonian air and space museum").

According to one embodiment, the VCode comprises at least two parts—a VBook identifier portion and a VPage identifier portion, with the portions separated by a separation character (e.g., the * key of a telephone keypad). For example, the Smithsonian Museum may have a VBook of VPages for its displays. The Smithsonian VBook number may be 38367 and Monet's Water Lillies painting may have a VPage number of 789. To access the Smithsonian's Monet Water Lillies VPage, the user would enter 38367*789 (VBook * VPage). Also, Van Gogh's Sunflowers painting may have a VPage code of 790. The user may enter 38367*790 to access the voice information corresponding to that painting.

According to another embodiment of the present invention, a VCode may comprise multiple portions, at least one of which may correspond to a predetermined category. For example, VPages may be categorized by content type (e.g., sports, television, retail, museum, etc.), content provider type (e.g., individual, company, organization, government), size (e.g., large, medium, small), cost (e.g., premium, discount, regular), and other methods of categorization. For example, an individual VPage may be assigned 463*123456, where 463 corresponds to an individual VPage and 123456 is the code assigned to the specific individual's page.

If the user desires, it is also possible for the user to simply input the VBook number, whereby the system may prompt the user for a VPage identifier. Also, when the user is finished with one VPage from a VBook, the user may move to another VPage within that VBook by inputting only the VBook identifier (instead of having to input the VBook and VPage combination again). Other VCode schemes could include a portion that identifies a VCode provider or VNAP to identify a VNAP on whose server a VBook or VPage resides and/or a content provider identifier portion to identify a content provider whose content is being provided. For convenience of reference, a VCode with two or more portions will be referred to as a multi-level VCode. Each portion of a multi-level VCode may be separated by a separation character (e.g., the * key). Alternatively, different separation characters can be used to designate different portions of a VCode. Other VCode schemes may be used.

Another aspect of the invention relates to a VCode registration system. VCode registration, according to one embodiment of the invention, enables a central system for registration of VCodes or portions of VCodes. For example, if many companies provide content that is accessible through a VNAP, each company may have assigned to it one or more codes to identify that company. That company identifier code may be a portion of a multi-level VCode that permits users to access that company's content via a VNAP. The registration system preferably stores information identifying where that company's content is stored, so that a VNAP can retrieve such content when requested by a user. Other aspects of the VCode registration system are described below.

According to one embodiment, a VCode registry resides at the VNAP (or in communication with the VNAP). When a user enters a VCode, the VCode registry is checked to determine where the content corresponding to the VCode is stored. The VCode registry returns the address of the content for use by the VNAP to retrieve the requested content. If the VCode is a multi-level VCode, the VCode registry can resolve the various portions of the VCode to identify the content the user is requesting and its location.

Another aspect of the invention relates to storing content that may be retrieved via telephone, preferably so that the user may hear the content. The content may be stored in various formats. One convenient format for storage of certain content is a sound file format. In other cases, content may be stored in other formats. For example, content may be stored as text. In this case, when the text is retrieved, it may be passed through a text-to-speech engine to create synthesized sound for the user to hear. The content is preferably stored as separate VPages. Preferably, whenever content is stored, a VCode or multi-level VCode is assigned to it, and the VCode and any other information necessary to retrieve the content is stored in one or more registries.

According to one embodiment, content may be created by a VNAP. Thus, a single organization may both create the content and make it available to users via a VCode system. However, it may be desirable for a VNAP to encourage others to create and/or update content for the VNAP. In this case the creator of content will be referred to as a content provider, although it should be understood that a VNAP may also be a content provider as that term is used. For various reasons, including those detailed below, it may be desirable for content providers to register with a VNAP. Various procedures and protocols may be established by a VNAP to govern the posting of content to the VNAP's VCode system. Various mechanisms by which content may be posted are detailed below.

In one embodiment, participants in the system may be permitted to create voice content to be presented in VPages through a VPage creation module that provides a user interface through which VPages may be created. That module may be accessible over the Internet (World Wide Web) or over a telephone network. The voice content that a user may create may comprise structured voice pages including audio, dialogs, menus, and links and may be stored in a variety of formats as well. The voice content may be stored as a XML-based voice file (e.g. TML or Voice XML), that references sound and text files. In this embodiment, participation is made easier by enabling users to call a VPage creation module via a telephone or log into a VPage creation module via the internet and through a series of menus, create a VPage. In one embodiment, the user records his or her voice for the module. That VPage is then be stored by the VNAP or other system for access by users of the network. For example, the VPage creation module may ask a VPage creator to input the name of the VPage, and the user is then prompted to speak the name. Next, the VPage creator may ask the user to input the subject matter of the VPage and the user is then prompted to speak the subject. Then the VPage creator may ask the user to input the body of the VPage and the user may then record the body. Prompts may then be provided to provide links to other VPages and requests for other content. The VPage creation module may also be used to modify or change an existing VPage. For example, through a web interface via the Internet a user may be presented with a depiction of the structure of a VPage. That web page interface may then present the user with a selection to generate an outgoing call to a telephone through which the user may create and store audio for inclusion in the VPage being reviewed online.

One embodiment of the invention relates to a system and method for enabling users to use these novel VCodes to selectively access stored content via a telephone device. Based on information made available to the user, the user calls in to a VNAP and enters a VCode corresponding to the desired content. The VNAP locates the requested content (e.g., by referring to the registry) retrieves the content (e.g., the VPage or VBook) and provides the content to the user via the user's phone, enabling the user to hear the content. In some cases, the VNAP may also provide text for display on the user's phone, or other output to a wireless access protocol device.

A user may access a VNAP by dialing a central number for the VNAP. As detailed below the number may by a local number, a long distance number, an 800, 888, 877 (or equivalent) number, (e.g, 1-800-TALKNET, 1-800-VNET411, 1-888-88-VOICE), a 900 (or equivalent) number, or in some cases may be some other combination of keys. For example, a VNAP may arrange with one, several or even all wireless network providers to enable its customers to contact the VNAP by dialing "*V" or some other easily remembered combination of characters, such as #VN, 311 or #VOICE. Also, wireless phones or other devices may be provided with a special key or input to directly access a VNAP. Also, through arrangements with the telephone company, landline telephones may access the system through a code like (*V, for example) as well. Also, a direct link on certain phones may be provided upon picking up the handset.

According to one embodiment, the following business method may be implemented. A VNAP coordinates with a VCode display host for the host to display a sign or other indicator of a VCode, preferably for an object, attraction or subject associated with a display host location. Preferably, the display comprises the VCode, a brief description of the content available for that VCode and a central number (or other directions) for contacting the VNAP. Upon seeing such a display of interest, a user places a phone call to the central number for the VNAP, and when prompted enters the VCode of interest. The VNAP provides the user with content via the user's phone, preferably audible content corresponding to the selected VCode.

The VNAP may charge the user a fee for the content. The VNAP may bill the user in any of a number of ways as described herein. According to one embodiment, the VNAP shares a portion of the fee with one or more of the display host(s), the content provider(s) and phone network(s) over which the phone call is made. According to another embodiment, the VNAP pays a set fee to the VCode display host entity. The VCode display host may also be the content provider and therefore, may receive a share proportionally to its contribution to the system.

One example of this embodiment is as follows. The VCode display host entity may be a museum. One or more exhibits at the museum may have a VCode displayed in association therewith, along with the central number for the VNAP. If the user desires to obtain more information about the exhibit, the user dials the central number to connect to the VNAP, and when prompted, enters the VCode for that exhibit. The VNAP in turn retrieves content associated with the entered VCode and plays it for the user over the user's phone. The VNAP charges the user a fee (e.g., per call, per code, per minute or otherwise). The revenue derived from a VCode linked to the museum is recorded by the VNAP and a predetermined portion of that revenue may be paid to the museum. This method is beneficial for several reasons. The visitors benefit because their experience can be enhanced by receiving additional information for selected exhibits. The museum benefits because its patrons are provided additional benefits without cost to the museum, and in fact, the museum may obtain additional revenue from fee sharing with the VNAP. The VNAP benefits by collecting revenue for the service it provides. The VNAP and/or museum may also benefit in other ways.

For example, according to another embodiment, the VCode system may be used to enable a user to request a transaction. For example, the museum or other organization may offer souvenirs and other products or services that can be ordered via telephone by use of a VCode or in connection with use of a VCode. For example, a VCode may be assigned to a particular transaction (e.g., the purchase of a souvenir associated with an exhibit). The VCode may be displayed in proximity to the exhibit (or elsewhere). The user may call the central number and, when prompted, may enter the VCode to indicate the desire to execute the transaction associated with the VCode. If necessary, the VNAP may collect other information from the user to complete the transaction.

According to another embodiment, if a user calls the central number and enters a VCode corresponding to a request for content, the VNAP may inform the user of available transactions during the call. For example, if a user calls a VNAP and enters a VCode associated with information or other content pertaining to an exhibit, the VNAP may provide the user with a voice menu that informs the user of related information, services or transactions. For example, if the exhibit is an art exhibit, the user may call a central number and enter a VCode to find out more information about a particular painting. One piece of information provided may be the artist's name. According to one embodiment, the user may be given a menu option that enables the user to purchase a book or other article pertaining to that artist. The user may purchase that book by entering a number or other input as specified in the menu.

Various fee generating and billing methodologies may be implemented. According to one option, the central number to the VNAP may be a 900 number (or similar number) so that the user is charged based on the duration of the call. According to another option, the VNAP charges the user based on the time of the call (e.g., by the minute, in six minute intervals, by the hour, etc.), on a per call basis, on a per VCode basis or on a subscription basis. For example, a VNAP may set up a service that enables a user to pay a flat fee (e.g., monthly) for limited or unlimited access to content via VCodes. If a fee is charged on a per VCode basis, different fees may be charged for different VCodes. To facilitate this model, credits may be sold by the system, wherein different VCodes may cost a different number of credits. By charging based on credits, consumers may be charged different amounts based on their purchasing history. The per unit cost may be reduced for users who use the system more. Also, by charging in credits, the actual cost is not presented as part of the consumers' purchase.

Additionally, the VNAP may charge users for calling into the VNAP and may also charge VCode providers for access to its users. The VNAP then works as an information broker, taking a commission from both sellers and buyers of that information.

According to one business model, the VNAP may make the call free to encourage users to call. In this case, the VNAP may provide general or basic information for free but once the user is connected to the VNAP, offer "premium" VCodes corresponding to more detailed or valuable information, transactions or other fee generating mechanisms. Also, if the calls are free to users, the VNAP may generate revenues by charging the VPage providers a fee for providing their information on the VNAP. The VPage providers may include vendors, manufacturers or agents, for example, to build VPages about the items that they are marketing to consumers. For example, products may be labeled with a VCode so consumers may find more information about the product prior to a purchase.

As another method of generating revenue in this system, the VNAP may also charge advertisers for including their advertisement content with VPages. The advertising revenue may be kept by the VNAP or distributed to the various VCode providers with whose pages the advertisements were associated.

As detailed below, one such fee generating mechanism may be to encourage the user to be transferred to another VPage, VBook, VAdvertisement, or other "location," whereby the VNAP is paid a fee for such transfer. According to one business model, a referral fee may be paid to the VNAP and/or content provider for referring a user to another VPage, VBook, VAdvertisement or VNAP.

One or more VPages may contain advertisements that are delivered to a user's phone (e.g., a voice ad). A VAdvertisement may comprise a portion or a complete VPage that advertises a product or service using voice. That VAd may provide the user with the option to purchase a good or service during the interface. The VAd may be selected based on the content requested by the user. Providers of VAds may be charged to have that VAd referenced or included in a VPage. The VAd provider may pay the VNAP, the VPage content provider or both. The VAd may be played for each or selected users upon accessing the VNAP central number or at other times. The charge may be a flat fee for a period of time, a fee for each user for whom the VAd is played or otherwise. The VAd provider may make that payment as a flat fee or based on any transactions that take place as a result of the VAdvertisement.

In the case where transactions are provided, transaction processing may be performed by the VNAP or the VNAP may transfer the call to another transaction processor. The transaction processor may be an operator, an automated system, or some combination of the two that guides the user through the transaction process (e.g., with a voice menu prompting the user to enter input via the keypad of the user's phone or otherwise).

In one embodiment, the user may be able to register with the VNAP and provide certain information, for example, name, address, billing informnation, phone number, etc. Other information such as personal preferences, demographics and pyschographic data may be provided during the registration process or subsequently accumulated by the VNAP. This registration and other information may be used in a variety of ways. For example, the user's phone number (or phone numbers) may be used in connection with a caller ID or similar service to identify the user each time the user calls in. This may enable the VNAP to accumulate a transaction history for the user. The transaction histories for each user may be stored by the VNAP in a data warehouse or other convenient storage system. This registration information also facilitates the ability to conduct transactions (for example, the purchase of goods) via the VNAP. If the VNAP identifies a user based on a caller ID (or other mechanism), and the VNAP has a profile for the user including address and credit card information (among other things), transactions may be conducted without requiring a user to enter all of this information for each transaction. If desired, security codes or passwords may be used to provide extra protection for the user and VNAP. Also, voice print authentication may be used to ensure the identity of a caller, particularly for high cost usages of the system.

According to at least one embodiment, the content of a VPage is preferably an XML-based voice content file (e.g., TML or VoiceXML) that may be interpreted by a XML-based voice content interpreter and played for the user via the user's phone. As discussed below, XML-based voice content files are structured to provide call flow. According to another embodiment, a VNAP may also maintain an index of information or other content that is available corresponding to a VCode. For example, a VNAP may store XML-based voice content VPages, each having a corresponding VCode and may also store an index of other information (in other formats), where selected index entries may be provided to the user (e.g., via a voice menu). If the user is interested in one of the indexed entries, the VNAP retrieves the information corresponding to the selected indexed entry and provide it to the user via the user's phone. For example, the VNAP may pass the information through a text-to-speech engine to create a sound file and play the sound file for the user via the user's phone. Alternatively, or in addition thereto, text or other content may be displayed on or output to the user's phone or other terminal device. Dynamic VPage generation may also be provided where VPage content is generated on the fly from other content.

In one example, the other information may correspond to information available via the World Wide Web. The index may be created by the VNAP by using standard indexing techniques or bots that search the web for content related to the content of stored VPages. Real-time searches may be done by a VNAP during a user's call to provide current information related to the VCode entered by the user based on keywords associated with the VCode. This aspect of the invention has several advantages. One advantage is that for many topics relating to content of a VPage, it would be costly and require a lot of storage to convert each "hit" from a web search to a sound file. By using the technique described herein, only if a user desires access to other information beyond the stored sound file is it necessary to convert the other information to a sound file, which may be stored for subsequent use or not. Other databases may also be searched for related information or other content.

One example of how various individual features described above may be implemented is as follows. A tourist in Washington, D.C. visits the Washington Monument. The person desires to learn more information about the Washington Monument. The user notices a sign posted next to the Washington Monument which indicates a VCode, and a central number that the person may call to find out more information about the Washington Monument. Accordingly, the person places a call with a wireless phone (e.g., by dialing a central number, such as an 800 number or *V on a wireless phone network to connect to the VNAP), enters the VCode and listens to the voice content from the VPage corresponding to the VCode. At convenient times, the VNAP may present the user with a menu of additional options about or relating to the Washington Monument. The menu of options may include historical data about the Monument, how the Monument was constructed, the geographic location of the Monument, the weather forecast for the area around the Washington Monument, restaurants located near the Washington Monument, bus routes and schedules near the Washington Monument, rates for taxi cabs from the Washington Monument to another location, or any of a variety of other options. Additionally, transaction options may be provided by the VNAP. Specifically, the user may be given an option to purchase a miniature model of the Washington Monument, purchase tickets to take a guided tour of the Washington Monument, or pay to hear patriotic music while touring the monument. All of these options may be presented within a menu driven system by the VNAP based on the entry of the VCode. Because of the vast amount of information and options that may be provided, hierarchical or cascaded menus may be used.

In such a system, the National Park Service that allowed the VCode to be posted, the content provider that posted the content corresponding to the VCode(s) accessed and the VNAP may all receive a portion of any fees charged based on the user's access to the content.

According to another embodiment, a more interactive approach may be used. For example, the VPage corresponding to the Washington Monument VCode may provide the user with general information that relates to the Washington Monument. Then, the system may say "What else would you like to know about the Washington Monument?" The user could then input a voice response which is then translated using speech recognition, natural language query technology, and/or artificial intelligence to determine the best fit of the information that is available. For example, the user may say "I would like to purchase a miniature copy of the Washington Monument" and accordingly the user would be passed to the transaction processing system to perform that task. Similarly, the user may say "I am at the Washington Monument, how do I get to Arlington, Virginia?" In response to that request, the VPage may transfer the user to a VPage providing directions from downtown Washington to Arlington, Va.

Also, multiple voice pages may exist relating to a subject from different voice content providers. Therefore, a given object may have a number of different VCodes relating thereto. For example, Monet's Water Lillies may have a VPage in the Smithsonian but may also have a VPage from the British Museum with different content. In the Smithsonian, the Smithsonian's Water Lillies VCode may be displayed, but in an art book published by the British Museum, the British Museum's VCode may be displayed. The VPages may also link to one another to provide different perspectives on the same subject. One example may be VPages about a new movie wherein different newspapers provide a different movie review for a particular movie. An advertisement for the movie may list several of the VCodes of the VPages from different newspapers that reviewed the movie and stored that review as a VPage on that newspaper's VBook.

An overview of the system architecture for enabling a VCode system according to the various embodiments described above, and other embodiments will now be summarized. In a basic embodiment, the system comprises user telephony devices connectable over a communications network to a VCode provider (VNAP) that provides be voice content over the communications network to the user, based on a VCode assigned to that content by a VCode registration system. The user system comprises a telephony device (e.g., a wireless phone) for enabling the user to input voice and/or push button input (DTMF) and to receive voice content through the speaker portion of the phone or other telephony device. Other types of devices for input and output may also be used as the user system.

The user connects to the VNAP over a communications network, such as a telephone and/or wireless telephone network or the Internet, to the VNAP by dialing a predetermined telephone number. Any suitable communications network may be used in addition to and/or alternatively to the telephone networks and any mechanism for connecting may be used for that communications network.

The VNAP receives the telephone call from the user, prompts the user for a VCode corresponding to desired information, and then delivers that desired information. The VNAP may comprise a number of modules to accomplish this functionality. According to one embodiment, users call into a call center to access VPages using a VCode. The call center processes a request through a voice browser module that uses speech recognition and text to speech modules to interpret user requests for additional VPages or transactions. Once speech is received, a XML-based voice content interpreter reviews the XML-based voice content VPage being accessed to determine an appropriate response. The interpreter passes the request to a voice server which provides security, personalization, content retrieval and billing modules to operate a safe and effective VPage retrieval and delivery system. In another embodiment, the VNAP may comprise a call center for interfacing with the communications network. An incoming call is received by the call center which may identify the user and prompt the user for authentication information. Once the user is authenticated, the user inputs information about the desired page. The user supplies the requested inputs, including the VCode corresponding to the desired content.

As used herein, the term VCode should be understood to refer to an alphanumeric identifier. The term Vname may be used to refer to a verbal identifier that may be used to request voice content through a voice input system of the present invention. Throughout this specification, if the term VCode is used, it should be understood that that VCode may be input through entry of the VCode or verbal communication of a corresponding VName. Also, the VCode and corresponding VName may be the same in some embodiments of the present invention.

The VCode is provided to a VCode identifier module to identify the VPage corresponding to the VCode and to determine where that VPage is located. The VCode identifier module determines the VPage requested and then passes the identification of the desired page to a VPage retrieval module. The VCode retrieval module accesses a VPage database in communication with the VNAP to retrieve the VPage. That VPage is then passed to a VPage execution module and VPage menu module. The VPage execution module executes the VPage in conjunction with a voice output module and optionally a voice personalization module. The voice output module generates audible output from the VPage under control of the VPage execution module and passes the audible output to the call center to relay it over the communications network to the requesting user.

The VPage menu module presents menu options to the user as part of the VPage execution and controls what information is presented in the menu. As such, the user may respond to the menus presented with a choice. The choice received from the user's telephony device is passed by the call center to the choice interpretation module which cooperates with the VPage menu module to determine the content or transaction processing that the user desires. If a transaction is desired, then the user's transaction request is passed to a transaction processing module which may cooperate with a transaction processing system to process the request. Additionally, the VNAP provides a billing module for tracking the user's activity on the VNAP for use in billing and allocation of fees collected from the user for use of the system. Also, the VNAP may have a preregistration and personalization module for enabling the user to preregister with the VNAP for purposes of setting up an account and for indicating how content requested is preferred to be delivered to that particular user. A telephone number identification system (such as a caller ID system) may be used to determine the user's identity to effectuate the selected personalizations or a user may be prompted for a password/code during the call, upon which the pre-registered personalization features may be used by the VNAP during the call session.

That module may also be responsible for authentication, which may differ by VNAP and/or VCode. Authentication may comprise caller identification and may also involve password input. Voice print identification may also be used. Authentication may be set by subscribed users and content providers for specific VPages. For example, if a content provider creates a VPage with several transactions, the content provider may want to authenticate callers with called identification and password authentication to make sure that the transactions are secure. If a user and content provider have both set up authentications, then the authentication module may select between the two, such as by selecting the most secure method.

A registration system is also provided in communication with and/or as part of the VNAP to enable the VNAP to register each VPage or VBook and have a VCode assigned thereto. Users may then input the assigned VCode to request that particular VPage and may be displayed in association with the subject of the VPage. The registration system may have a database that stores correspondence between a VPage and VCode and other information as desired. A specific VCode naming convention may be used by the registration system as described herein.

According to another embodiment, the VPages provided as content may be provided by content providers. The content providers may download the voice content to be included in a VPage through HTTP, email, direct link, FTP or any other data delivery method. The content providers may provide the information as voice files, text files, or TML/VoiceXML (Telecaster Markup Language/VoiceXML Language)) coded files (described below) or any other format that may be used to generate audio output.

The VNAP may further connect to a VCode display host system which displays VCodes associated with content subjects. The VNAP may forward payment of fees to the VCode display host system based on access by users to the VNAP from VCodes posted by the VCode display host system, or based on other agreed fee sharing arrangements.

According to another embodiment of the invention, the system may comprise a plurality of VNAPs connected over a network. Therefore, VPages may be provided at each VNAP and may be accessed by users that call into another VNAP due to the unique VCode assigned to each VPage.

According to another embodiment of the invention, one or more VNAPs may connect over a communications network to one or more VPage server systems. The VPage server systems may host one or more VPages and one or more VBook. The VPage server may thus store and serve VPage information to users directly or through the VNAP. In this embodiment, when the user requests a VCode from a VNAP, the VNAP determines through the VCode identifier module whether the VPage corresponding to the VCode is hosted by a VPage server at that VNAP or by another VNAP. If the VPage is maintained by another VNAP, the VNAP connects to the other VNAP over the communications network, requests the VPage corresponding to the VCode and executes the VPage according to the above description. Because VPages may be added and revised frequently, the VCode identifier module may cooperate with a VCode resolution system that accesses a global registration system to determine the VPage and VNAP corresponding to a requested VCode.

Each VPage server may host one or more VPages or VBooks and may comprise a database system that stores each VPage or VBook. Additionally, transaction processing hosts may store transaction information in other databases.

Each VPage server may comprise a plurality of modules for performing this functionality. Specifically, the VPage server may serve identified pages over the communications network to the VNAP requesting them. Also, a VPage storage engine may be provided for storing VPages in the associated database system when received from a content provider. A VPage translation system may be provided to convert text files to voice files for storage as voice files or for delivery to users and may perform other translation functions as desired. An email/FTP processing system may be provided by the VPage server to receive email and FTP downloads of content from content providers for storage in the database and inclusion in one or more VPages. Also, a voice-to-text system may be provided to convert voice files to text, if desired. A voice recording system may also be provided to enable content providers to directly record voice content for storage and inclusion in VPages. Also, a TML engine may be provided for creating, compiling and storing TML files that are to be stored and served by that VPage server. This and other system architectures may comprise a voice network access system that connects these components to provide a community of users that are connected to a community of content providers through one or more VNAPs.

Other objects and advantages of the invention will be apparent to one of ordinary skill in the art upon reviewing the detailed description of the invention.

BRIEF DESCRIPTION OF THE DRAWINGS

FIG. 8 depicts an example of a subscription graphical user interface according to an embodiment of the present invention.

FIG. 10 depicts example screen displays of a graphical user interface for configuring a VPage according to an embodiment of the present invention.

DETAILED DESCRIPTION OF THE INVENTION

Figure 1:
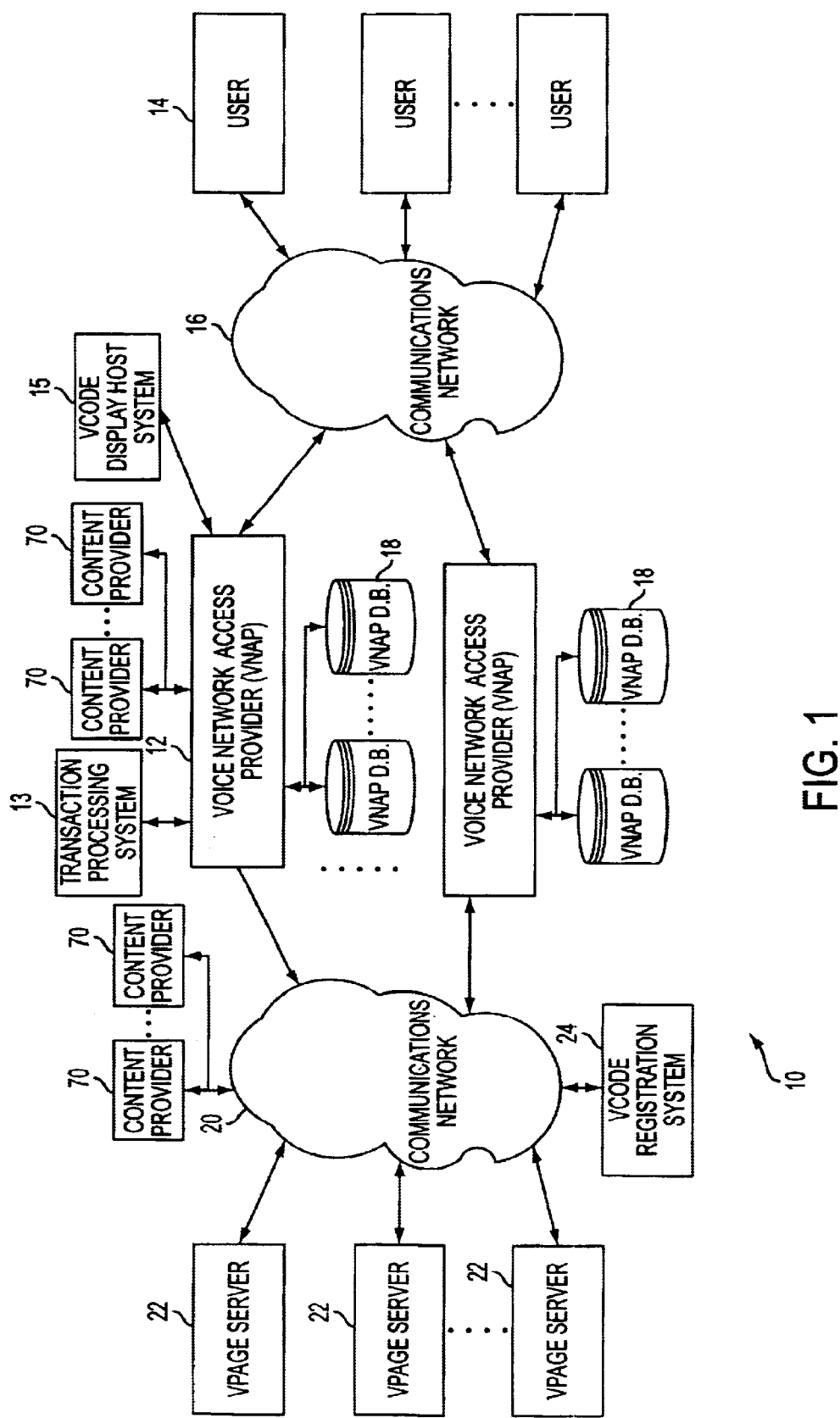
FIG. 1 depicts a schematic diagram of a VCode system according to an embodiment of the invention.

As discussed above, a VCode system provides access to voice content by entry of a VCode or VName. In one embodiment, a VCode comprises a VBook identifier portion and a VPage identifier portion separated by the asterisk and concluded by the pound character, such as 76484766426*2777223#.

VCodes may also be specified with alphanumeric strings, using the standard telephone system for mapping letters to digits (A, B, and C map to the number 2, D, E, F to 3, etc.). Thus the above VCode could be specified as:

SMITHSONIAN*AIRSPACE #

In this embodiment, the first field of a VCode—the VBook identifier—refers to the VBook. In this example, the VBook has VBook identifier 6484766426/SMITHSONIAN.

The second field of a VCode—the VPage identifier—refers to the specific VPage on the VBook. It may be a single numeric string, such as this above example of 24777223/AIRSPACE. It may also be a series of numeric strings—including even the empty string. Thus a VCode could resemble any of the following:

SMITHSONIAN#
SMITHSONIAN*AIRSPACE#
SMITHSONIAN*AIRSPACE*APOLLO13#
SMITHSONIAN*AIRSPACE*APOLLO13*STORE#

According to one embodiment of the invention, a VCode system 10 is provided. The VCode system 10 comprises one or more VNAPs 12 connectable to a plurality of users 14 over a communications network 16. Each VNAP 12 may comprise a plurality of VNAP databases 18. Additionally, VNAP 12 may connect over a communications network 20 to one or more VPage server systems 22 and a VCode registration system 24. Through VCode system 10, users 14 connect to the VNAP 12 to receive content corresponding to one or more selected VCodes. User 14 may utilize any type and combination of equipment that enables input of voice or other content and receipt of voice content, including telephones, wireless phones, personal digital assistants, and other devices. Communications network 16 may comprise a LAN, WAN, telephone network, a wireless phone network, a digital network, a cable network, a satellite communications network, a PCS network, the Internet, or other networks or combinations of networks that enable communications between users and a VNAP. VNAP 12 may deliver the content out of VNAP databases 18 or, based on the VCode, provide content from one or more of the VPage server systems 22.

VNAP database 18 may comprise any database capable of storing text, sound files or other content and may reside either locally within a VNAP 12 or externally over a connection of networks. VNAP database 18 may store content provider/source information to be able to track who is responsible for which VPages. That information may include name, address, contact information, listings of all VPages and Vbooks provided, VCodes corresponding thereto, account information for that provider and other such information. VNAP database 18 may also store user statistics in order to the VNAP to track usages by different users. Those statistics may comprise user identification, number of VPages accesses, identity of all VPages accessed, time of each access, transactions undertaken by that user, amount of transactions undertaken and all other information a VNAP or content provider may desire to acquire to better leverage and service its customers. Communications network 20 may comprise any suitable network similar to network 16 and may comprise the same network as network 16. VPage server systems 22 may comprise systems for retrieving one or more pages of content based on the VCodes or other input entered by the user. VCode registration system 24 may comprise a system for assigning VCodes to VPages.

According to one embodiment, VCode registration system 24 comprises a database system that indexes VPages by VCode, which as described above, comprises a unique combination of VBook identifier and VPage identifier portions. The VNAP system retrieves information from VCode registration system 24 to retrieve VPages. Each entry in the VCode registration system stores the source location of the content (e.g., URL, disk storage location, database, IP address, network path, etc.), permissions on who is allowed to view content, description of the voice content, billing information, resale information and the format of the content (e.g., TML, VoiceXML, WML). Other fields (metadata elements) may be provided that describe the content of the Vpage. These metadata elements can assist in indexing content by subject, or in conjunction with search engines. That metadata may include a description of the VPage and keywords to aid in using a search engine to locate the VPage.

For each VBook, a main VPage may be stored. Therefore, when a subscriber enters only the VBook identifier, then the main VPage is retrieved and the pages with different VPage identifiers for that VBook may be cached because it is likely that the subscriber may be accessing them. Therefore, the subscriber may enter the VBook identifier only once and may access all VPages in that VBook by entering only the VPage identifier portion. When the subscriber moves to another VBook, the cache may be cleared according to one embodiment.

According to another embodiment, it may be desired to provide multiple VCodes for the same VPage. For example, different content providers may actually "sell" the same VPage and therefore desire to have a separate VCode for that VPage. To handle VCode aliasing, each VPage may be assigned a VPage ID. The relationship between VPage ID and corresponding VPage may be one-to-one (whereas the VCode-to-VPage relationship may be many to one). In this embodiment, the VCode registration system 24 comprises a VPage database indexed by VPage ID and a VCode lookup table that indexes VCodes to VPage IDs.

Also, the VCode registration system 24 may utilize the two-portion VCode structure in indexing the database. In this case, VPage IDs are replaced with Book VPage IDs and Indicator VPage IDs. In this situation, the relationships VBook:Book VPage ID and VPage Indicator:Indicator VPage ID are each "one to many." Lookup tables provide mapping of these values. A main lookup table provides an index by a primary key comprising at least the Book VPage ID and Indicator VPage ID. In this case, the VBook may be independently aliased from the VPage Indicator (and the VPage Indicator independently of the VBook). This embodiment allows for a voice content provider to have multiple VBooks without having to explicitly alias each VCode (or multiple VPage Indicators without having to explicitly alias each VCode).

In the case of VNames, ASR-specific grammar information or possibly a specification of the VCode's location in a hierarchical structure may be used to index VNames to VCodes/VPage IDs.

In one embodiment, the VBook may be assigned to the by VCode registration system 24 and the Voice content provider is free to choose any VPage identifier naming scheme that satisfies the above format. This gives voice content providers the ability to structure their available voice content in their own hierarchical manner.

A voice content provider (VCP) company may want a number of VCode prefixes to map to its site. For instance the Smithsonian Institution may want the above SMITHSONIAN (easy-to-remember) as well as the easy-to-type 44SMI. In this case, multiple numeric strings (76484766426 and 44765) would map to the same voice content provider in VCode registration system 24. Further, a VCP may choose to have a number of VPage Indicator values map to the same VPage on its site. Thus SMITHSONIAN*AIRSPACE# and SMITHSONIAN*AIR# might both map to the same content.

Figure 2:
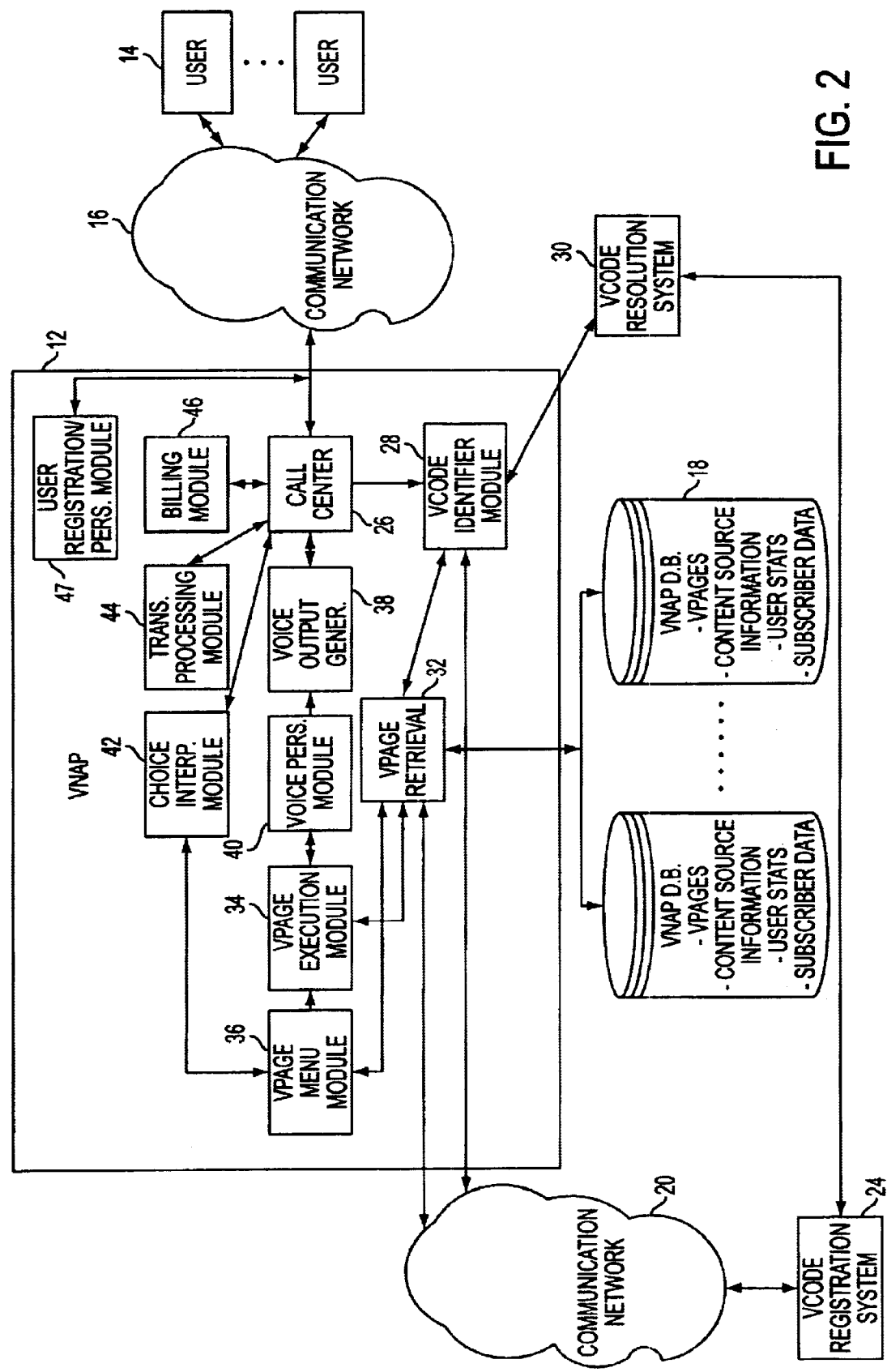
FIG. 2 depicts a more detailed diagram of the VNAP architecture for use in a VCode system according to an embodiment of the invention.
Figure 7:
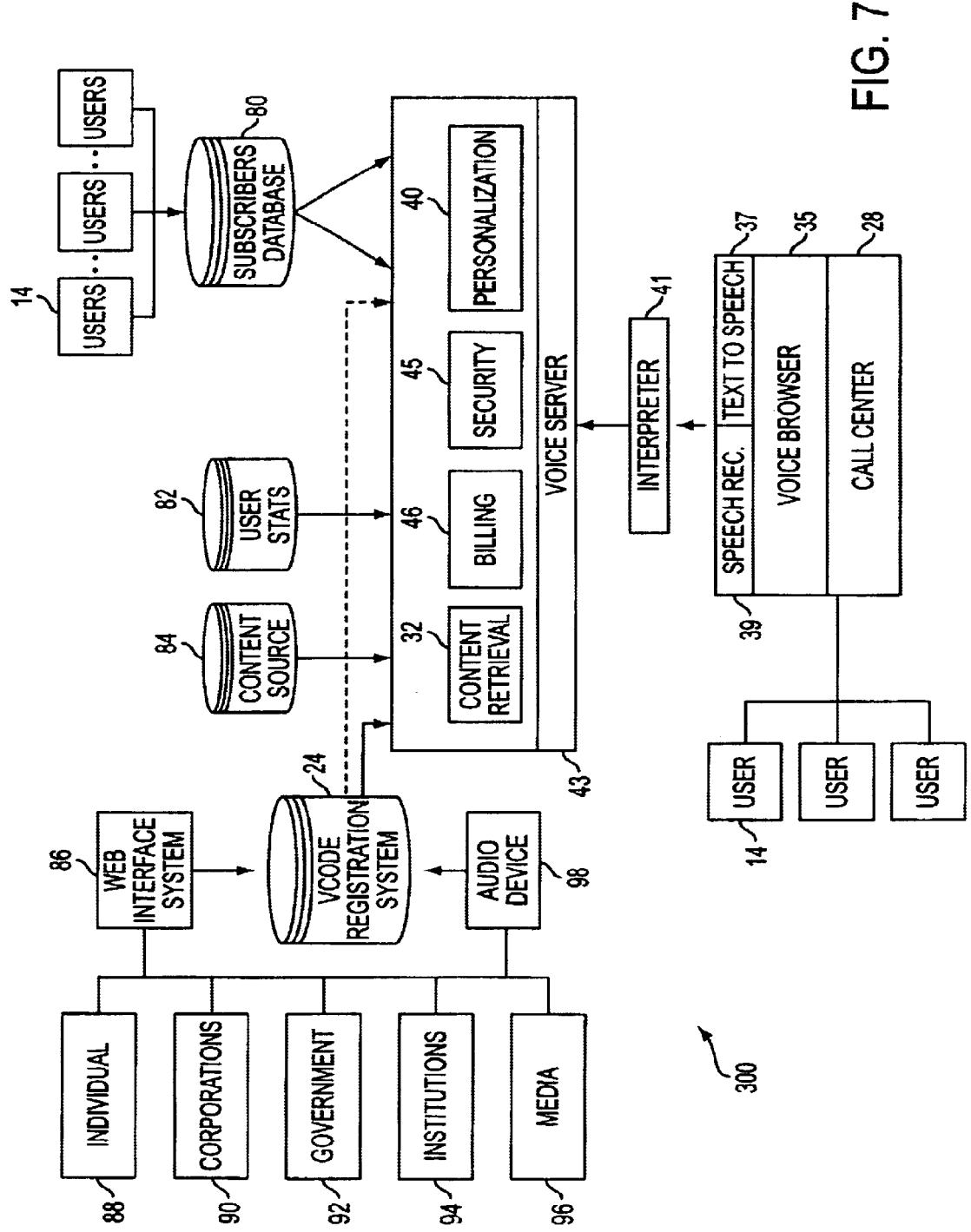
FIG. 7 depicts a schematic diagram of a VCode system according to another mbodiment of the present invention.

A more detailed description of the contents of VNAP 12 may be understood with reference to FIG. 2 and FIG. 7. First, a user registers with the VNAP and accordingly a VNAP registration/subscription module 47 is provided. VNAP 12 may also comprise a user pre-registration and personalization module 47 that enables users to contact VNAP 12 and establish an account for billing and personalization purposes. To pre-register, the user may input name, address, contact information, payment mechanism information, preferences, demographic information, language, etc. Other types of information requested during registration may be input and stored as well. The VNAP may assign the user with a registration number that may be used to access voice over the VNAP 12. Further, the user may personalize how services are to be billed, may input payment information for use in transaction processing, and may select personalization features for delivery of voice content, including specification of information for use by voice personalization module 40. User preregistration and personalization module 47 may also be known as a subscription module 47 herein and these terms are meant to be interchangeable.

Figure 8:
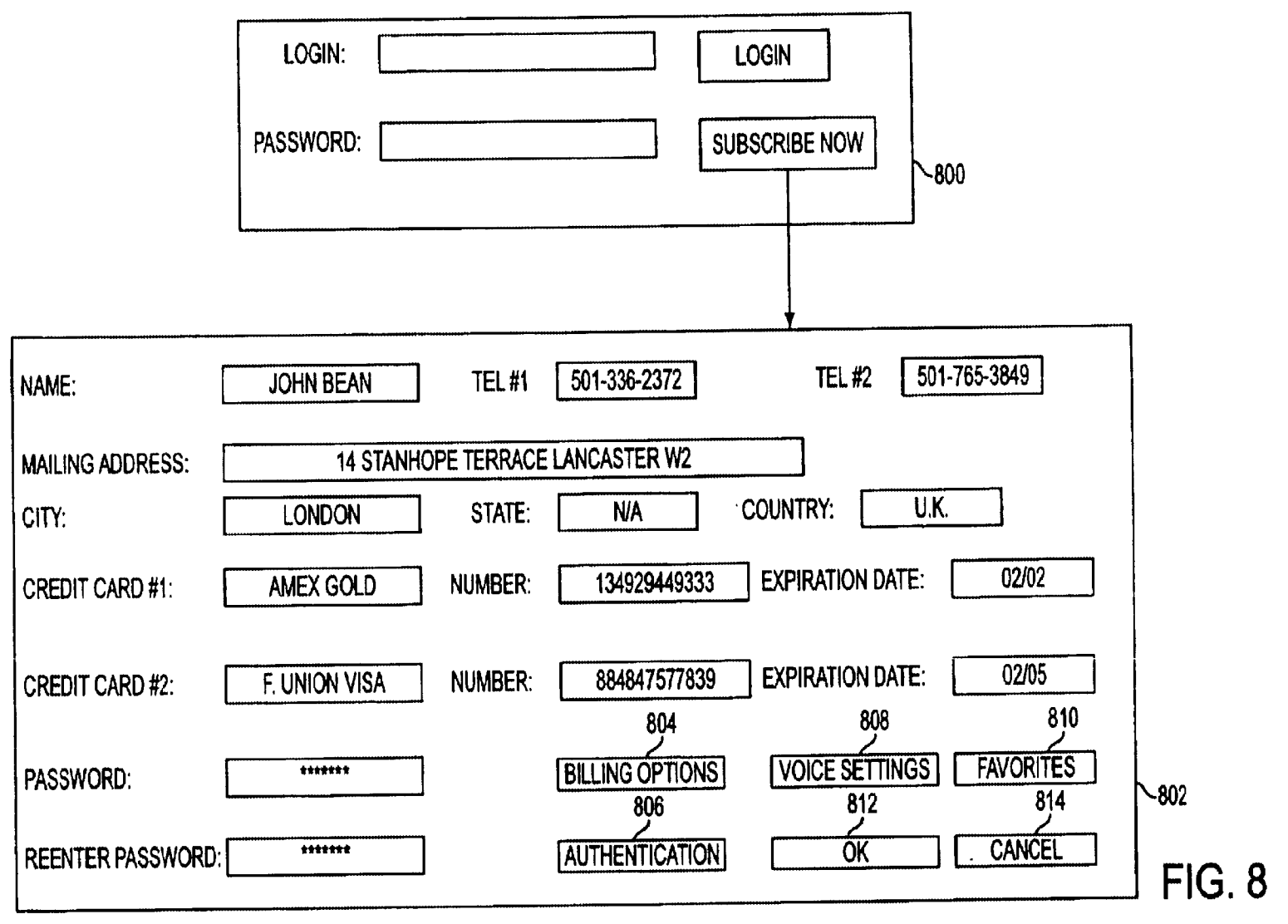

According to one embodiment of the present invention, subscription module 47 may provide a web subscription interface to enable potential subscribers to connect over the worldwide web in order to sign up for VPage services. FIG. 8 depicts embodiments of graphical user interfaces that may be presented as part of a web interface to users in order to subscribe to the VNAP system and modify their subscription as well. A first screen 800 may be automatically presented upon logging into the web interface. This screen may provide a log in and password fields to enable existing subscribers to log in and change their registration or personalization information. If a user is not already a subscriber, then a subscribe now button may be provided to enable a potential subscriber to participate in an online subscription process. Upon selecting the subscribe now button, a subscription interface 802 may be presented to the user. Subscription interface 802 may request a number of different types of information about the subscriber in order to more effectively personalize the voice content provided by the VNAP system.

According to one embodiment, as depicted in FIG. 8, the subscriber's name, telephone numbers, mailing address, credit card information and passwords may be requested. Specifically, multiple credit card information may be input to enable the user to later on choose which of a plurality of credit cards to which to charge transaction fees encountered upon utilizing the system. Further, a password may be requested for authentication as described in detail below. By choosing a password, the user may better protect access to its VNAP account information and charges to that account. Specifically, in addition to using the telephone numbers provided for caller identification, the VNAP system may authenticate the user through requesting that the user input the password chosen during the subscription process. Additionally, subscription interface 802 may provide a plurality of buttons to enable the user to move to different interfaces to input additional information, cancel the subscription, or accept the subscription. Subscription interface 802 may comprise a billing options button 804, an authentication button 806, a voice settings button 808, a favorites button 810, an OK button 812, and a cancel button 814. Billing options button 804 may be selected by the user to access the graphical user interface that enables the user to alter the billing options for his subscription to the VNAP system. For example, the subscriber may be provided the option of buying a credit plan which provides a cheaper per credit rate.

Voice settings button 808 may be provided to enable the subscriber to modify the voice settings for the voice output for the VNAP system. These settings may, for example, modify the output of the text-to-speech (TTS) engine. The settings therefore may apply to voice output from text-based files and, according to one embodiment, not to pre-stored audio files. According to another embodiment, the settings may apply to all audio output.

Modifications are helpful because, for example, the user may want to customize the tone, speed, volume, language, gender, etc. of the voice that generates the output. A favorites button 810 may also be provided that upon selection enables the subscriber to input a list of favorite voice pages for easy access to those voice pages. The favorites page may comprise a listing of VPages, VCodes and aliases for those VPages (e.g., a user may use "my newspaper" for the Washington Post VPage).

The subscription may also comprise a dynamic entry point to the current location of the user using GPS technology in a mobile phone. When a caller calls into the system, the system authenticates the user by caller id, determines if the user is calling from a mobile phone and identifies where the user is calling from. From this point on, the user may ask questions and the responses may be personalized to the user's location (e.g., where am I? What restaurants are nearby?).

Also, an authentication button 806 may be provided that upon selection presents a graphical user interface to enable the user to select the level of authentication desired for their use of the VNAP system. The default level of authentication may be caller identification using the telephone numbers provided in the subscription interface. Also, a user may desire to use address, credit card or other information to verify the identity of the user. Using caller identification alone allows anyone who gets a hold of a phone and calls the VNAP system to use the personal settings of the phone owner. Using additional levels of authentication, however, provide greater security to the subscriber to prevent misuse of the VNAP system. If additional levels of authentication are input in the subscription phase, the VNAP system requests that information during log in each time the user enters the network. Password based authentication mode is another option. The user selects a password through the subscription interface and that password may be requested each time the user enters the network. Also, users may request voice print identification as another level of authentication. In this embodiment, the user records a voice print through the subscription interface, and that voice print is compared to the user's voice when the user logs onto the network for accessing the VNAP system.

Once all of these settings are selected, the user may select OK button 812. Alternatively, if the user wishes to cancel the changes or inputs entered by the subscriber, then cancel button 814 might be selected. Once all of the settings are selected and the OK button 812 is entered, the customer is notified that the subscription is over, and that access to the VNAP system will be provided within a predetermined amount of time. At that time, the subscriber may access the VNAP system. The next time the subscriber visits the subscriber interface, he or she may log in using the log in name and password to make modifications to the subscription. The subscription process described is extremely simplified for all users, since no hardware or software set ups are required. A user may visit the VNAP web page only once, unless he or she intends to be a content provider and/or unless he or she wants to make changes to the subscriber profile. In allowing users to manage administrative options, this user administration site provides them with a simple and intuitive GUI. This site may greet users with a main page asking registered users to log in and inviting guests to register. Registered users who log in are presented with the main menu and guests who elect to register are presented with the registration page.

The main menu allows the following links: My Profile, My Billing, My Preferences, and My Content.

"My Profile" brings up the Profile Administrator. According to one embodiment, this section may allow users to: View/set/change Full Name, View/set/change Nickname, View/set/change Address(es), View/set/change Phone number(s), View/set/change Email(s), etc. "My Billing" brings up the Billing Administrator. It allows users to set and change billing options. "My Preferences" links users to a page that allows users to change their TTS settings preferences (male/female, speed, pitch, etc.). "My Content" may provide links to subscriber-provided content in the VNAP system to enable a user to create, modify, or delete content provided on the system.

As depicted in FIG. 2, VNAP 12 may also comprise a plurality of modules to enable delivery of content to users based on the input of VCodes corresponding to the content. Specifically, VNAP 12 may comprise a call center 26 for receiving input of VCodes and delivery of content.

Access to the call center 28 may be through a predetermined phone number or communications protocol on a voice-enabled device as described above in the summary. A VCode identifier module 28 may be provided for determining the VCode input by the user. VCode identifier module 28 may utilize an indexed database of VCodes and corresponding VPages that it may access directly or over a network, and/or may utilize a VCode resolution system 30 that may be external to VNAP 12 to assist VCode identifier module 28 in determining the identity and location of the VPage corresponding to the VCode entered. VNAP 12 may also comprise a VPage retrieval system 32 for retrieving a VPage corresponding to the VCode entered by the user either from VNAP database 18 or over communications network 20 to one or more of the VPages servers 22. VCode resolution module 30 may communicate with VPage registration system 24 to access an up-to-date database of VCodes and corresponding VPages and return that information to the VCode identifier module 28.

VCode resolution module 30 may retrieve VPages that are not in a local VPage registry. VCode resolution module 30 may also periodically update the local VPage registry to make sure that it is up-to-date. To expedite delivery of VPages, VPage retrieval system 32 may also retrieve all VPages from the selected VBook and store those VPages in cache for subsequent delivery. For example, if the VCode input by the user relates to the Smithsonian Monet's Water Lillies, it may be desirable for the VPage retrieval system 32 to retrieve all Smithsonian VPages and store them in cache since it is likely that this user will request additional Smithsonian VPages. By storing these VPages in cache, the user's wait time is significantly reduced.

Upon retrieval of the VPage corresponding to the VCode entered, a VPage execution module 34 may be provided for executing the content of the VPage. Execution of the content may include playing the content, scanning the VPage for certain tags or markers to include other VPage information, generate call menus and other tasks. VPage execution module 34 may coordinate with a VPage menu module 36 that is provided within VNAP 12. VPage menu module 36 presents, receives and interprets menu options presented in a VPage. VPage menu module 36 may comprise a TML interpretation module that utilizes TML/VoiceXML or other voice-based XML file formats as the VPages to understand the menus that are to be presented to the user to enable the user to maneuver within the system, as described in the computer program listing Appendix hereto. VPage menu module 36 may also comprise a VoiceXML interpretation module, a Nuance Grammar specification language module or a Java Speech grammar format module. VPage menu module 36 may interpret predefined menu options and determine which of the options to execute based on choices selected by the user from a choice interpretation module 42, as described below.

VNAP 12 may also comprise a voice output generation module 38 for outputting voice signals. Voice output generation module 38 may play voice files, may comprise a text-to-voice conversion module for "reading" text files as voice output or any other type of module for taking a data file and generating voice output to be directed by input output module 26 to the appropriate user. Optionally, a voice personalization module 40 may be provided that enables a user to select personalized features for the voice content. Personalization features may include tone, pitch, language, speed, gender, volume, accent, and other voice options that a user may desire to make the information more understandable or desirable.

Voice personalization module 40 modifies how voice output generation module 38 generates voice content to correspond to the user's desired choices. The voice personalization features may be set by a user upon subscribing and automatically applied when that user logs into the system. Personalization module 40 retrieves information from subscriber database once he logs onto the VNAP. In doing so, the caller does not need to specify his information at any point during the session. If he is filling out a form or running a transaction, his pre-fetched information is placed where necessary. Personalization module 40 also may present the user with a portal VPage, allowing the user quick access to the content they frequently access. Personalization module 40 also may access the user's bookmarks or customized applications stored in the subscriber database 80. Also, if VPages store user specific information, then personalization module 40 may retrieve that information. Personalization module 40 may also allow users to modify speech output settings as described above.

VNAP 12 may also comprise a choice interpretation module 42 that may be used to interpret responses from users, such as those based on menu options. Choice interpretation module 42 cooperates with VPage menu module 36 and call center 26 to enable VNAP 12 to respond to user requests based on menu options presented within a VPage. For example, if the menu provided by the VPage includes five options, choice interpretation module 42 may determine which of the five options to execute based on the input received through call center 26 from the user. If the user presses the number 1 on the telephony device, then choice interpretation module 42 generates a signal that indicates to VPage menu module 36 to execute choice 1. Choice interpretation module 42 may comprise a more complicated system as well. Various call menu technologies generally are known and can be used. The user may also be able to respond with voice-based choices. Choice interpretation module 42 then uses voice-to-text conversion, natural language interpretation and/or artificial intelligence to determine which of the available menu options the user desires, as described in greater detail below with reference to FIG. 17. Other systems for interpreting and executing user menu choices may also be used for choice interpretation module 42. One of the choices available to a user from any VPage may be to select another VPage. A user may do so by inputting the VCode (including verbally saying the VName corresponding to the VCode) for the content desired. If the VPage desired is from the same VBook as the present VPage that the user is receiving, then the user may only input the VPage identifier from the VCode or speak the VPage portion of the VName (e.g., Monet's Water Lillies) to receive that desired VPage.

Additionally, a transaction processing module 44 may be provided for processing transactions presented in a VPage. Transactions should be understood in a broad sense to include purchase of goods, request for services, making or changing reservations, requesting information, and any other type of transaction that may be performed by a telephone or other information exchange system. Additionally, a transaction processing module 44 may be provided within VPage server system 22 as described in detail below. Transaction processing module 44 may cooperate with transaction processing systems 13 to process various transactions.

VNAP 12 may also comprise a billing module 46 for monitoring user's access to various VPages and enabling VNAP 12 to allocate fees received from the user to system participants including VNAPs, content providers, VPages, VCode display hosts, transaction processors, and others. Billing module 46 may be used to record the time a user logs into the VNAP 12, to record times when users access new VPages, to record when users perform transactions, and other types of information that may be used for determining how to allocate fees received from the user for accessing the VNAP.

Billing module 46 may compute time spent and VPages accessed on the VNAP for each VPage. In one embodiment, it receives a credit value for the VPage as specified by the content provider and calculates the charges on a minutely basis throughout the caller's session. This information may be stored in the user statistics database 82 and/or VNAP database 18. Billing module 36 may track the following information. For each call, it may track time of day/day of week, call duration, call origin, VPages visited, etc. For each VPage, it may track "hit" frequency, revenue generated, demographics, etc. It may also track the advertisements presented, transactions performed, and other information.

Authentication/Security module 45 authenticates users that dial into the VNAP, as described above, and may also provide for network security. Authentication may be set either by the user or by the voice content provider. For exarnple, a content provider may impose an authentication mode for visitors viewing his VPage. In this situation, in one embodiment, the more extensive of the two settings is applied as the valid authentication mode. For instance, Jack selects default caller id authentication. One of his favorite voice pages, Ticket Master, however, imposes the password based authentication mode. Every time Jack dials into Ticket Master's VPage, he is prompted for his subscriber login and password. For other pages, which do not impose anything other than the default authentication, Jack retrieves them without an extra authentication process. Conversely if Jack had selected password-based authentication, he is prompted for a password at each voice page regardless of whether the voice page is default authentication or not. This way Jack not only prevents others from abusing his personal information during transactions but also ensures that they do not waste his credits by listening to content in the network. Also, authentication module 45 may prevent attacks from the telephone network, LAN, Internet or other access points. Further, authentication module 45 may disconnect a user after a predetermined period of inactivity.

VNAP 12 may communicate with one or more content providers 70 for the receipt of information or other voice content to be included in VPages offered by that VNAP. Content providers may deliver information to a VNAP in the manner described below with reference to FIGS. 3 and 5.

Figure 3:
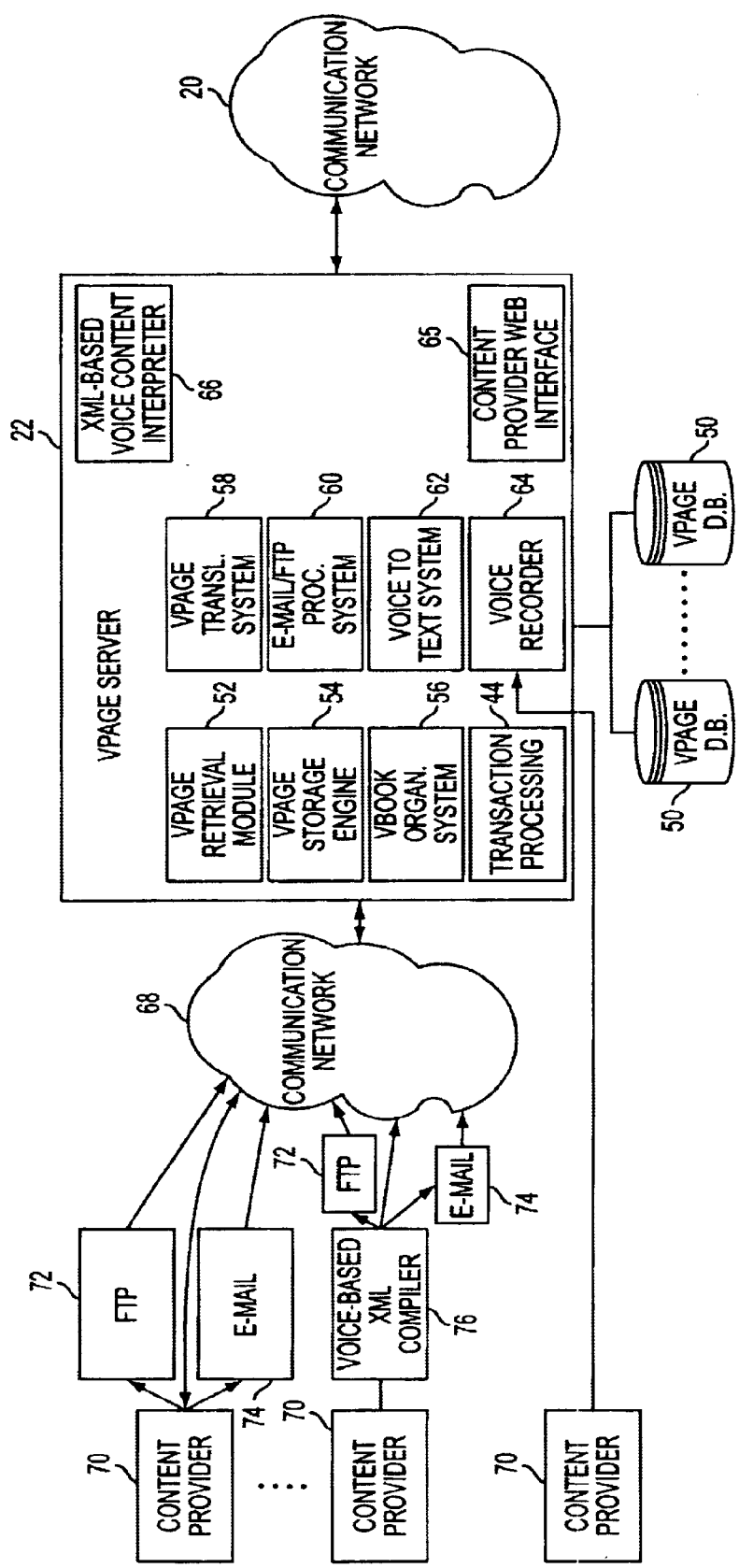
FIG. 3 depicts a system for downloading content to VPage server systems according to an embodiment of the invention.

FIG. 3 depicts a system for enabling content providers to provide content to VPage server systems 22. As mentioned above, VPage server system 22 may comprise a transaction processing module 44. Additionally, VPage server may comprise a VPage retrieval module 52 for accessing VPage databases 50 to retrieve VPages that are requested from the VPage server 22. Additionally, VPage server 22 may comprise a VPage storage engine 54 for receiving information and storing it in VPage database 50. A VPage organizational module 56 may also be provided to track and organize the various VPages within the VBooks hosted by VPage server system 22 and to organize the various VBooks maintained by VPage server system 22.

VPage translation system 58 may be provided for the purpose of translating text-based VPage data that is stored in VPage database 50 into voice communications. Additionally, an e-mail/FTP processing system 60 may be provided for receiving information via e-mail or FTP and storing that information through VPage storage engine 54 into VPage database 50. Voice-to-text system 62 may be provided by VPage server 22 to enable content providers to call in to VPage server system 22 and directly record voice content and store the content in the VPage database as text. A voice recorder 64 may be provided to record voice information and store it directly as a sound file in VPage database 50 or may pass voice files to voice-to-text system 62 to convert the voice files to text for storage in the database. XML-based voice content interpreter 66 may be provided for compiling, creating and interpreting XML-based voice content VPages, such as TML, VoiceXML, WML or others. As described in detail below, TML is a mark-up language based on XML. TML stands for Telecaster Markup Language which is a proprietary language of Microstrategy Incorporated. A detailed description of TML and how it operates is incorporated by the computer program listing Appendix. A plurality of content providers 70 may provide content to a VNAP 12. Content providers may provide voice content to be included in VPages to the VPage server 22 from a plurality of different mechanisms. Such mechanisms include using an FTP server 72, electronic mail 74, hand delivery or a TML compiler 76 that then transfers TML files via either FFP, e-mail or a hand delivery (i.e., via disk) to the VPage server 22 to be stored on a VPage database 50. Content providers 70 may provide files in sound, text or other format through FTP 72, e-mail 74, or TML compiler 76. Each of these files may be provided over a network 68. Network 68 may include a network similar to networks 16 and 20 and may comprise the same network as networks 16 and/or 20.

VPage server 22 may also comprise a content provider web interface 65 that enables content providers to be able to input VPage content into the system. Specifically, a web base interface may be provided to enable content providers to be able to specify various information about a VPage that they are providing to the network. That information may include the name of the VPage, the format that the VPage is in, the method of charging and selecting whether or not that content may be resold to another VPage. According to one embodiment, a web interface may be provided that first presents a user with one or more of the following options: to modify a subscription profile; to modify an existing VPage; create a new VPage; order labels and brochures for a VPage; review statistics regarding the use of one or more VPages provided by that voice content provider; and review account status with the VNAP. Corresponding interfaces for each of these options may be provided to enable the content provider to effectuate one of those options. The statistics review GUI may display to the voice content provider the number of users, time spent by users, and other relevant statistics. This may comprise a set of reports given by a data mining tool, such as DSS Web, offered by the assignee of the present invention, and the analysis given is limited only by the type of data seen. For instance, it may be possible to show a VCP what other pages users who frequent their pages go to, and demographics of users who see their pages.

Figures 10A, 10B:
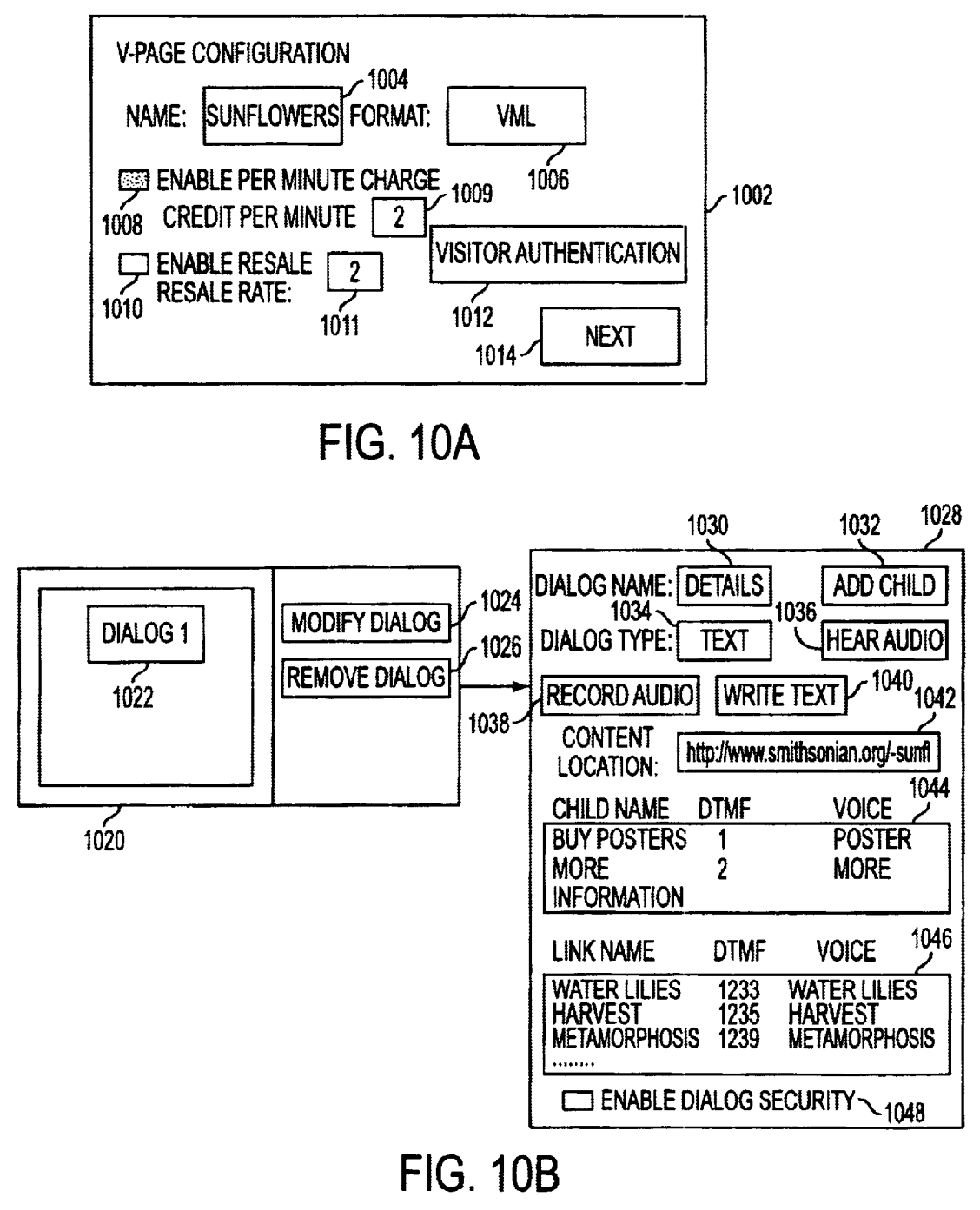

FIG. 10 depicts an embodiment of a graphical user interface system that may be provided to enable a content provider to create a new VPage or modify an existing VPage. FIG. 10(*a*) depicts a screen 1002 for VPage configuration entry. Screen 1002 provides a name field 1004, a format field 1006, a selection box 1008 that enables the content provider to enable a permanent charge, a credit permanent entry box 1009, a selection box 1010 that enables the content provider to select whether to enable resale, a resale rate entry box 1011, a visitor authentication box 1012 and innexed box 1014. Name entry field 1004 may be provided to enable the content provider to select a name for the particular VPage. The name selected may be the VName, for example. Ideally, content providers name the page intelligently to enable users of the system to be able to retrieve that VPage by simply pronouncing the VName. Accordingly, the VName selected ideally should be one that is easily pronounceable by a user through speech recognition technology.

In the embodiment of FIG. 10(*a*), the content provider here, for example, the content manager for the Smithsonian, desires to create a VPage for the Van Gogh sunflowers painting. Accordingly, the Smithsonian manager decides to name this particular VPage sunflowers and inputs that into name field 1004. The particular page being created here may be a VML type of page, and accordingly, the manager may input VML in the format field 1006. Further, the manager may decide to enable a permanent charge for the use of this page in order to generate revenue for the Smithsonian Museum. Accordingly, box 1008 may be selected as depicted in FIG. 10(*a*). Also, the manager may select to input two as the credits per minute charge for accessing this VPage in the field 1009. Here, the Smithsonian manager may decide not to enable resale and accordingly may not select 1010.

Visitor authentication button 1012 may be provided to enable to content provider to select the level of authentication required in order to access this VPage configuration page. A content provider may desire higher levels of security to protect the consumer and the content provider. For example, a VPage may contain a link to transactions where the content provider is using credit card numbers of the user. In that case, the content provider may want to authenticate the caller to make sure the transactions are secure.

Specifically, the content provider may be able to select between different levels of authentication in order to protect the security of the page. One level of authentication may involve caller identification whereby a user desiring to access this VPage is authenticated based on caller id. Also, an identification number and password (e.g., a personal identification number or PIN) may be authentication level may be assigned, either to a series of VPages or to each individual VPage. Accordingly, in order to access the VPage configuration for a particular VPage, a user may be requested to input user identification and password in order to access the VPage configuration. Also, voice print authentication may also be utilized if desired to require that the user authenticate his identity by speaking through a microphone to the VPage configuration site before retrieving a particular VPage. For example, one authentication method may comprise assigning each subscriber a registered phone number (e.g., a mobile phone number). If the user calls the VNAP from the registered phone number, the VNAP asks for a PIN to start a session. If the user calls from a different phone number, then the user is prompted to input the registered phone number and PIN before entering a session. Other methods of authentication may also be provided to enable the content provider to select the level of authentication that that content provider feels comfortable with in controlling the VPage content and transaction data related to a particular VPage or VBook.

Figure 12:
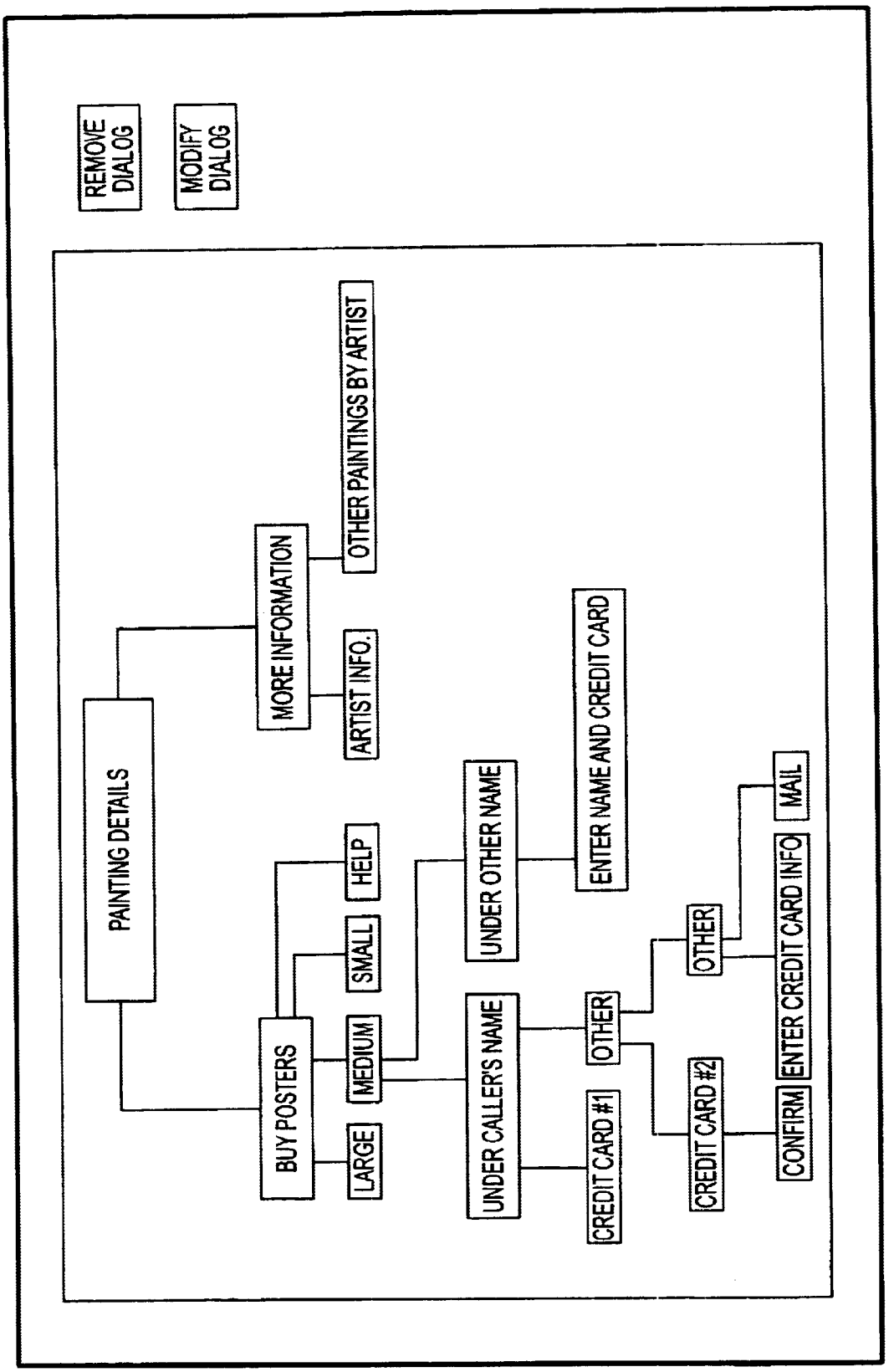
FIG. 12 depicts a screen display of a graphical user interface for reviewing the tree structure of a VBook according to an embodiment of the present invention.
Figure 13:
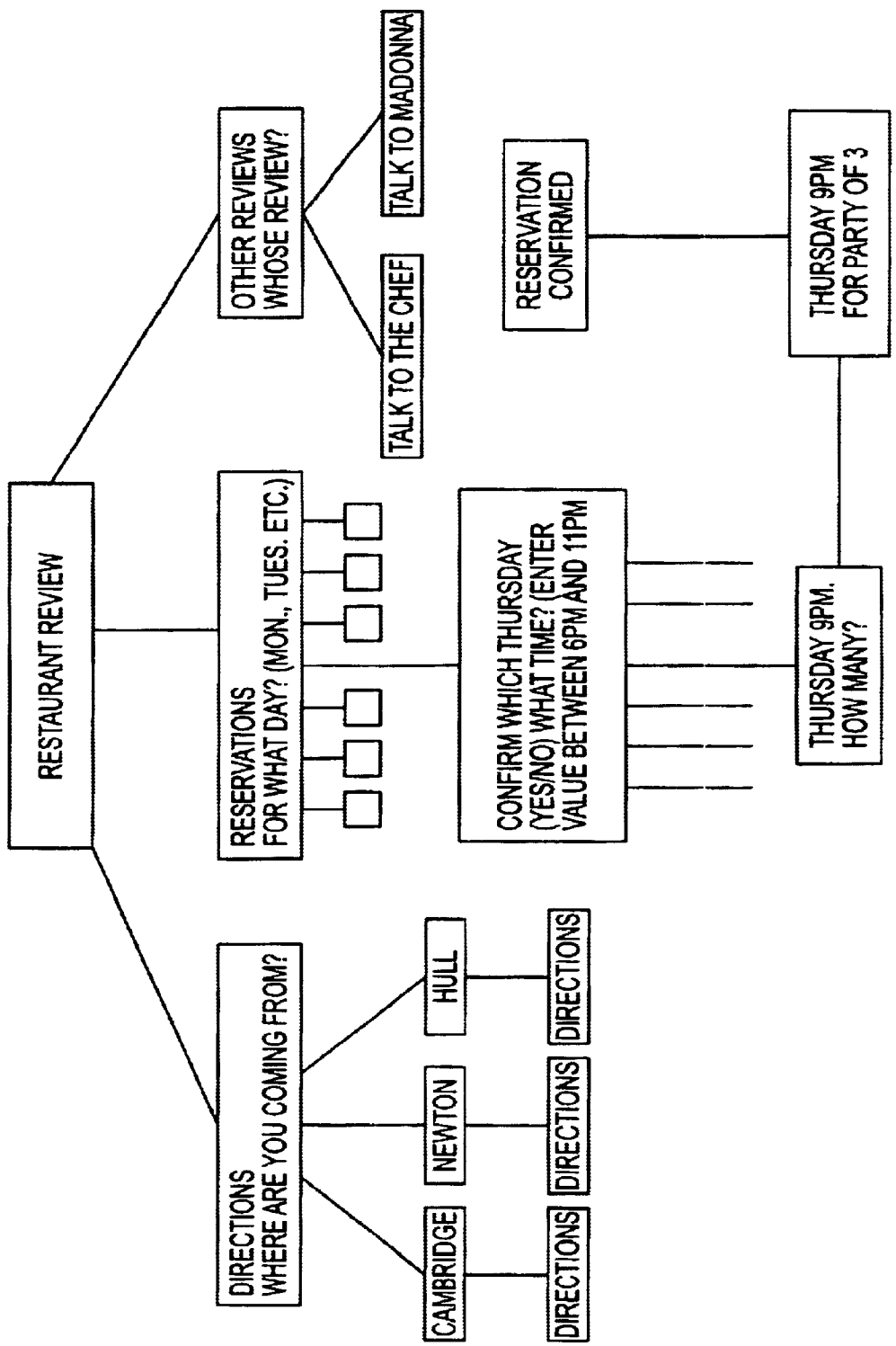
FIG. 13 depicts an example of a tree structure for VPages according to an embodiment of the present invention.

Once the content provider has established the VPage configuration as desired, next button 1014 may be selected to move to structure page 1020 as depicted in FIG. 10(*b*). Structure page 1020 displays a graphical representation of a dialog tree structure. This page enables content providers to create a tree of dialogues. According to one embodiment of the present invention, a dialog may be a basic unit of content in any given VPage. When a content provider gets to the structure page the first time, there is only one dialog waiting to be modified. The content provider may then select that dialog and hit the modify dialog button 1024 in structure page 1020. When multiple dialogues have been created, the user may remove dialogues by selecting remove dialog button 1026 after highlighting or otherwise selecting the desired dialog to delete. Examples of dialog tree structures are depicted in FIGS. 12 and 13 as described in more detail below.

When the content provider selects the modified dialog button 1024, a dialog page 1028 may be presented to the content provider. The dialog page may be provided to enable the content provider to specify various settings for each particular dialog within the VPage. According to one embodiment, dialog page 1028 may comprise a dialog name field 1030, an add child button 1032, a dialog type field 1034, a record audio button 1038, a hear audio button 1036, a write text button 1040, a content location entry field 1042, a child listing area 1044, a link listing area 1046, an enable dialog security selection button 1048.

Each dialog may be given a separate name to enable the user to understand the flow of dialogues within a particular VPage. In the example of FIG. 10(*b*), a Smithsonian content provider has selected details as the name of the first dialog to which any user is presented when selecting the VPage for the Smithsonian sunflowers page. In dialog type field 1034, the content provider may select the type of dialog. The dialog types may include text or audio format. Here, the user has selected a text field and therefore may press button right text 1040 in order to create text or may specify the location of a file in content location field 1042.

If the user desires to add a child to a particular dialog box, then the content provider may depress add child button 1032 and may be presented with an additional dialog page for the new dialog being created. If the dialog type is an audio format, the user may either record audio by depressing button 1038 or hear audio by depressing hear audio button 1036. Record audio button 1038 enables for the recording or modification of audio clips using the web interface provider.

According to one embodiment, by depressing this button, the system initiates a telephone call to the content provider to enable the content provider to make changes via the telephone. The content provider then may record the audio by speaking into the telephone where it is recorded by an audio recordation system provided by the system. Alternatively, or in addition thereto, a microphone may be provided to enable the user to record audio over the internet directly to the dialog creation website. In another embodiment, content may be created by the content provider providing the URL of an existing HTML page (along with certain parameters) whereby the module may then convert it to VoiceXML. The conversion application determines the number and nature of the parameters passed to it. For example, minimal parameters would include whether the voice page must accept touch tone input, perform voice recognition, or both.

Child listing 1044 may be provided to list the names of all children of this particular dialog. By selecting any of the children within this field, the user may be able to see the dialog page for that particular dialog and modify those dialogues accordingly. In this field, the name of the child is presented as well as the DTMF (touch tone codes) and voice codes that may be used to move to that particular dialog. For example, here to move from the details dialog to the by posters child, the user may either depress the one key on the touchtone telephone or may say the word poster through the telephone and the bi posters dialog will be initiated. Similarly, the more information dialog may be presented by the user either depressing the two button on the touch tone telephone or by saying the word more.

A link listing 1046 is also provided that comprises a listing of all of the different VPages to which a particular subscriber may transfer from this particular VPage without requiring entry of the full VCode. Here, the Smithsonian director may desire to input a listing to every other VPage provided by that particular museum. An example is depicted in FIG. 10(*b*) where the paintings for the Water Lilies Harvest, and Metamorphosis are provided with the VCodes that transfer to those particular VPages and the VCodes that could be used to transfer those particular VPages.

An example of the final tree structure for dialogues generated by this particular Smithsonian manger may be depicted in FIG. 12. As depicted in FIG. 12, a screen may be presented that shows a depiction of the tree structure and provides removed dialog and modified dialog buttons to enable the content provider to be able to add or modify the existing tree structure.

Figure 9:
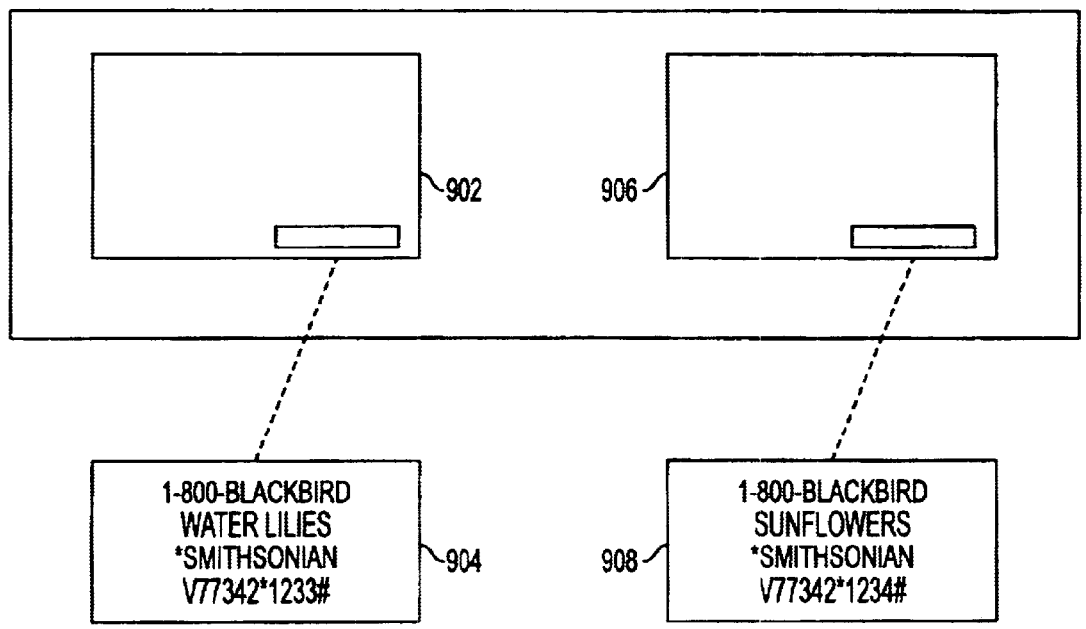
FIG. 9 depicts an example of VCode placement on an object of interest according to an embodiment of the present invention.
Figure 11:
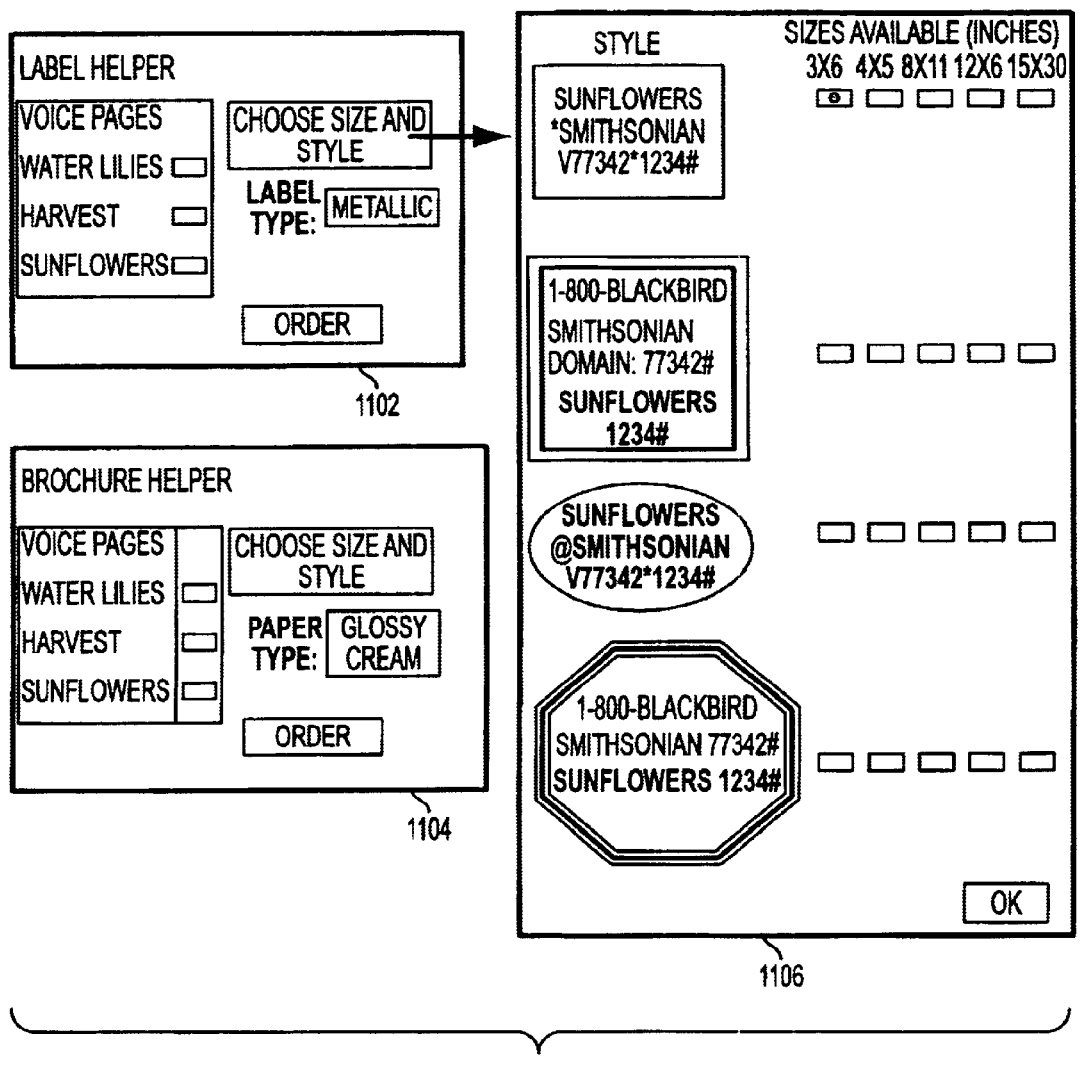
FIG. 11 depicts example screen displays from a graphical user interface for ordering brochures and labels corresponding to VPage displays according to an embodiment of the present invention.

As part of the content creating process, content creation module 65 may also enable a content provider to be able to create brochures and labels. The brochures and labels may be distributed or placed so as to indicate the VCode or VName for a particular object with which that content is associated. FIG. 9 depicts an example of a collection of paintings 902 and 906 with VCode labels 904 and 908 displayed in association with those paintings. As depicted in FIG. 9, the VCode label may comprise the telephone number to access the VNAP system 12, the VName of the particular VPage associated with the painting, the name of the content provider, and the VCode which comprises, in this embodiment, a code corresponding to the content provider, separated by an asterisk, from the code associated with the particular VPage in question, followed by the pound sign. In order to create these labels automatically, a label and brochure selection graphical user interface may be provided. In a first screen, the user may be asked to select whether he wishes to generate a label, or a brochure. A label helper 1102 or a brochure helper 1104 may then be provided to the content provider. Label helper 1102 enables the user to select which voice pages for which they would like to order a label, choose the size and style and label type and then depress a simple key to order those labels. The order would be processed using the billing information provided by the content provider when the content provider signed up with this particular VNAP to provide content to users. Various styles and sizes may be depicted in a graphical user interface 1106 to enable the content provider to more readily understand what is to be provided in the particular label being ordered. These labels may then be displayed in association with an object about which the VPage provides content. As shown in FIG. 11, various styles for VCode labels may be provided with differing formats for the content. In each label, the number to access the VNAP, the content provider and name of the particular VPage and the VCode may all be depicted in various formats.

A brochure may be a logical grouping of VCodes and names put together in order to provide further temporal and spatial flexibility and information retrieval. A brochure handed over to patrons of the museum, for example, enables the user to listen to the content not only as the user is walking through the gallery, but also after the user leaves the gallery. The brochure thus serves as a take home cyber guide.

Content providers may also modify VPages through interaction with content provider web interface 65 and its affiliated telephone content provider interface. In order to modify audio content, for example, a content provider may enter the system by dialing into an administrator privileges phone number for the VNAP and accessing all VPages for that particular content provider. For example, suppose that all of the posters for a particular painting in the museum are sold out but there are still a lot of mugs left in stock. The content provider may want to change the "buy posters" content to "buy mugs" for that particular painting to encourage mug purchasers. The content provider may dial the VCode, enter administrator log in and password and then change dialogues on the fly using the telephone interface. For example here, the system may ask the administrator "would you like to modify the details dialog?" Upon saying no, the system may ask "would you like to modify the information or posters dialog?" (following down the tree structure until the content provider has reached the particular dialog that they wish to change). Here, having reached the poster's dialog, the content provider may say "posters" at which the system may respond "You may start recording after the tone." Then the content provider may speak into the telephone and record the saying "buy more mugs." Also, that user may also effect a change to the transaction processing module to sell mugs rather than posters.

This interaction illustrates how a content provider may travel through the tree structure and modify the dialog to be changed. According to one embodiment, the content provider may not change the tree structure on the phone, although that may be possible as well. If the voice content provider cannot change the tree structure on the phone, that content provider may use the web interface to add or modify dialogues. Here, rather than deleting or changing the tree structure, the content provider is merely substituting one dialog for another without affecting the overall tree structure. In that way, the content provider is provided the ability to change content over the telephone to serve their users in a more timely and efficient way by encouraging frequent updates.

Although various modules have been described herein, it should be understood that each module may be provided as several modules and that modules may be combined. Additional functionality and/or modules may be provided without departing from the scope of the invention. The operation of each of these modules will be better understood in reference to the method of operation described below with respect to FIGS. 4 through 6.

Figure 4:
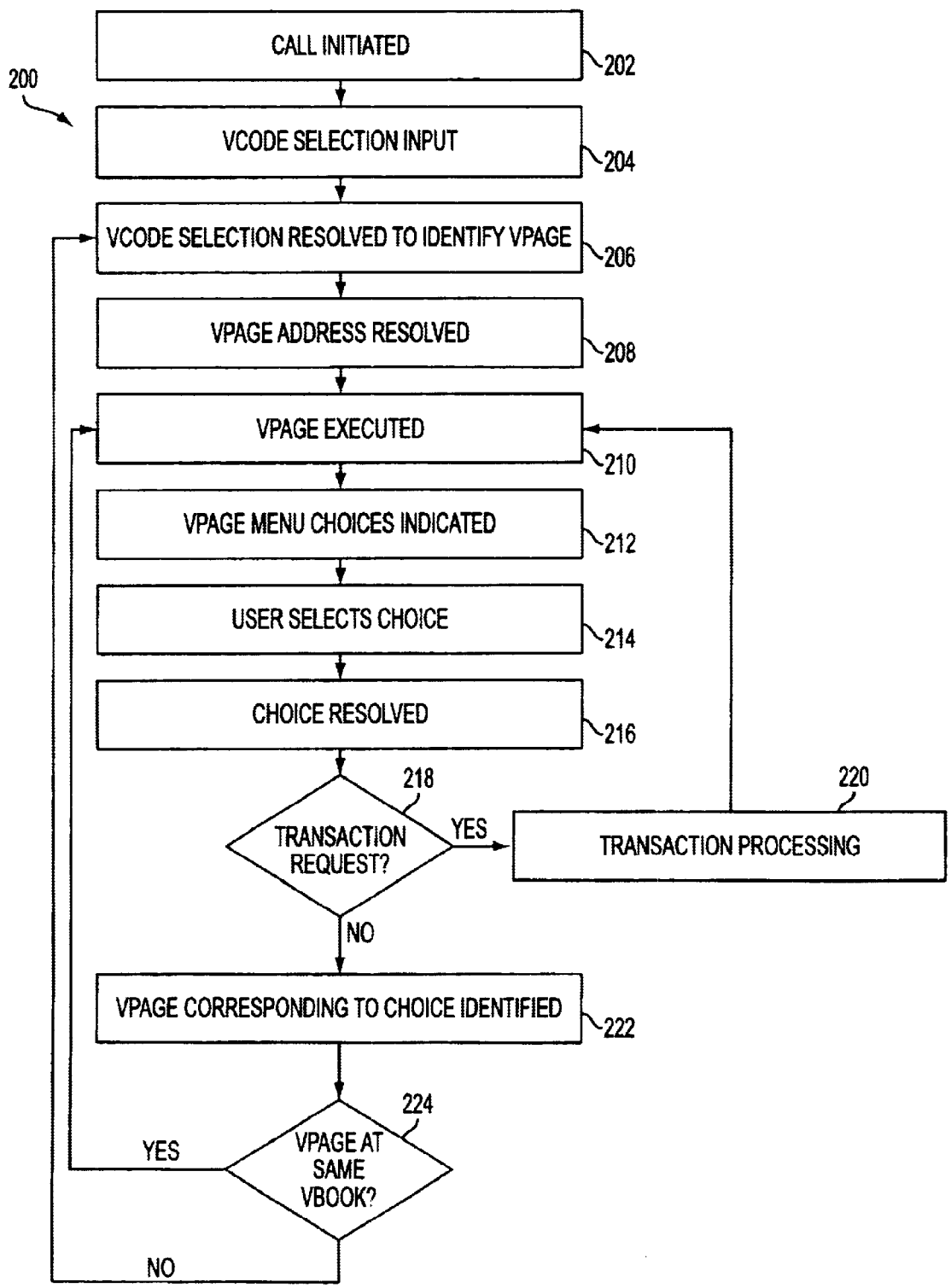
FIG. 4 depicts a schematic diagram of a method of operation of a VCode system according to an embodiment of the invention.

One method of operation of the VCode system may be understood with respect to method 200 depicted in FIG. 4. One embodiment of a process of operation of the present system begins when the user connects using a telephony device of a user system 14 through a communications network 16 to a VNAP 12 (step 202). The VNAP 12 prompts the user for a VCode.

The user enters the VCode or other input (step 204). The system resolves the VCode or input selection (step 206) to identify the identify and location of the VPage associated with that VCode or other input. According to one embodiment, the VCode identifier module 28 may be employed to determine the location of the VPage, or an external system, such as VCode resolution system 30, may be accessed to determine the location of a VPage. Once the identity and location of the VPage is determined, the VPage is retrieved (step 208). In step 210, the VPage is then executed. Specifically, VPage retrieval module 32 retrieves the VPage, and passes the VPage along to VPage execution module 34. VPage execution module 34 may then generate the voice output to the user using voice output generator 38 and voice personalization module 40, if desired, and the voice is then delivered using call center 26. Upon execution of the VPage, VPage menu choices may be indicated in step 212 using VPage menu module 36 which cooperates with voice output generator 38 and call center 26.

The menu options within the VPage may be indicated to the user in a number of ways. A listing of the various options may be presented in audio format, or as discussed above, natural language in artificial intelligence agents may be utilized to allow the user to indicate the desired choice, and then VPage menu module 36 may determine the best fit from the menu choices presented to the user. In either event, the user is prompted to enter a choice in response to the VPage. In step 214, the user inputs a choice, which is received by call center 26 and passed to choice interpretation module 42. Choice interpretation module 42 and VPage menu module 36 then resolve the choice in step 216 to determine what action the user desires. In step 218, it is determined whether that choice is a transaction request or not. If the request is a transaction request, then in step 220, transaction processing takes place and either returns the user back to the VPage or concludes and signs the user off of the system. If the choice is not a transaction request, then in step 222, the VPage corresponding to the choice is identified and then in step 224, it is determined whether the VPage is at the same server or a different server. If the VPage is on the same server, then control returns to step 210, and the selected VPage is executed. If the VPage is at a different server, then control returns to step 206 and the VCode is resolved. This process continues until the user decides to exit the system.

FIG. 7 depicts a VNAP system 300 according to another embodiment of the present invention. In this embodiment, VNAP system 300 comprises a plurality of users 14 that connect to a call center 28. Call center 28 connects to a voice browser 35 that operates in conjunction with a speech recognition module 39 and a text-to-speech (TTS) module 37. The voice browser 35 then passes information received to a interpreter 41 which communicates parsed inputs from a user to a voice server 43 that provides a plurality of modules. Voice server 35 serves voice content from content source 84 that has been provided from individuals 88, corporations 90, government entities 92, institutions 94 and/or media 96 through either a web interface system 86 or an audio device 98. A VCode registration system 24 is provided to assign VCodes to all VPages in the content source 84. The system also provides a user statistical database 82 and a subscription database 80. Users 14 may connect to a subscription interface, such as module 47, to input their information into subscription database 80.

Specifically, the system leverages a subscriber database that stores information for each subscriber to the VNAP system. Information received from the subscriber during subscription as well as usage information may be stored in the subscriber database. When a subscriber enters the VNAP system, the information in the subscription database is accessed and used during the session. Information may include subscriber name, user nickname, one or more telephone numbers (with categorization of type and/or function (e.g., home/business and fax/pager/mobile/land line, etc.)), one or more mailing addresses (with categorization of type (e.g., home, work, etc.)), one or more e-mail addresses, other contact information, credit cards (with type category such as Visa, Diner's Club, American Express, etc.), voice settings (e.g., gender, speed, tone, pitch, language, volume, accent, etc.), a list of favorites, user billing options and authentication settings (PIN, voiceprint, valid Caller ID numbers, etc.).

In addition, the subscription database may comprise information about what information is made public for a particular subscriber or group of subscribers. For each record, the user may mark an entry as being "public," "reveal on confirm," "reveal on authorize," or "private," for example. Values marked "public" may be visible to all voice content providers. Values marked "reveal on confirm" or "reveal on authorize" may be visible to individual voice content providers only upon user confirmation or authentication (respectively). Values marked "private" may be hidden to all voice content providers.

Also, some fields may always be private for the security of the system. For example, the VNAP may not want to allow even content providers to have access to credit card information, or at the very least may make that information "reveal on confirm" so the subscriber knows when that information is being provided to a content provider. Other values we may restrict entirely to "private" only (such as authentication settings). In a "reveal on confirm" situation, a VPage that desires to access the information may send a request to a confirmation module that requests confirmation from the subscriber prior to releasing the information from the subscription database to the VPage.

A user statistics database 82 may be provided. This database may be stored with subscriber database 80, may be part of the same database, or may be stored separately. This database collects information about how each subscriber uses the VNAP system including information about the number of VPages accessed, the identify of VPages accessed, the hours spent on the network for each VPage per user and also stores related billing information. This database is updated frequently so it creates multiple rows at each session when users move between VPages. User statistics database 82 cooperates with billing module 46 in order to properly charge users for accessing the system. User statistics database 82 may also store information so voice content providers may perform data mining on the information to better understand how to more effectively generate revenue. For example, by determining what VPages are hit at what times and what kinds of users hit them, the voice content provider may be better able to target his advertising. If, for example, a VPage related to a particular television show is used mostly by women in their middle thirties, then the content provider may include advertisements in the VPage that are suited to that demographic. Based on these findings, advertising schemes for content providers may be improved immensely.

When it is billing time, the contents of this database are grouped by distinct users and billing statements are generated by billing module 46 through use of billing information stored for subscribers in the subscription database 80. Similarly when the payments are received, this time billing information is grouped by content providers and split properly by billing module 46.

Figure 18:
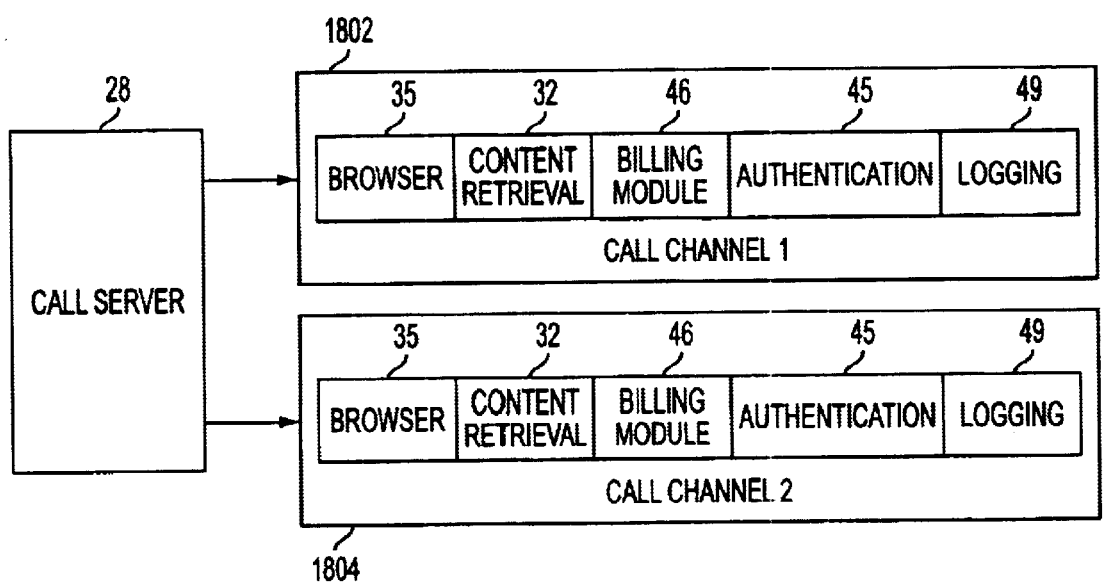
FIG. 18 depicts a call server system according to an embodiment of the present invention.

Voice server 43 may comprise content retrieval modules 32, billing modules 46, security/authentication modules 45 and a personalization module 40, among others. In general, as depicted in FIG. 18, a call center 28 (or call server) may initiate a different thread 1802/1804 for each incoming call. That thread 1802/1804 may comprise an instance of a voice browser 35 (including speech recognition module 39, text to speech module 37 and interpreter 41), and a voice server (including content retrieval module 32, billing module 46, security/authentication module 45 and logging module 49).

With this design, the system does not have need for a complex thread manager, and communication between modules happen in the thread's stack and memory space. In this embodiment, voice browser 35 communicates directly with voice server 43 which in turn communicates with other modules in the thread. With this model, load balancing is simplified. These modules may all reside on different machines, or on the same machine. In one possible scenario, voice browser 35 announces to voice server 43 that it is ready, and voice server 43 decides that it should talk to the authentication module 45 on Machine X, personalization module 40 on Machine 1, and content retrieval module 32 on Machine *. In a preferred embodiment, each of the modules is thus a separate object with single points of entry that do not depend on any shared "global" values to communicate with one another. By leveraging existing technologies, such as COM and DCOM, the locations of these modules is relatively flexible.

While voice browser 35 manages state transitions between dialogs, voice server 43 handles centralized tasks that do not require the information as to which dialog in the VPage the caller moves to. Centralized tasks may include personalization, authentication, content retrieval and billing.

Figure 16:
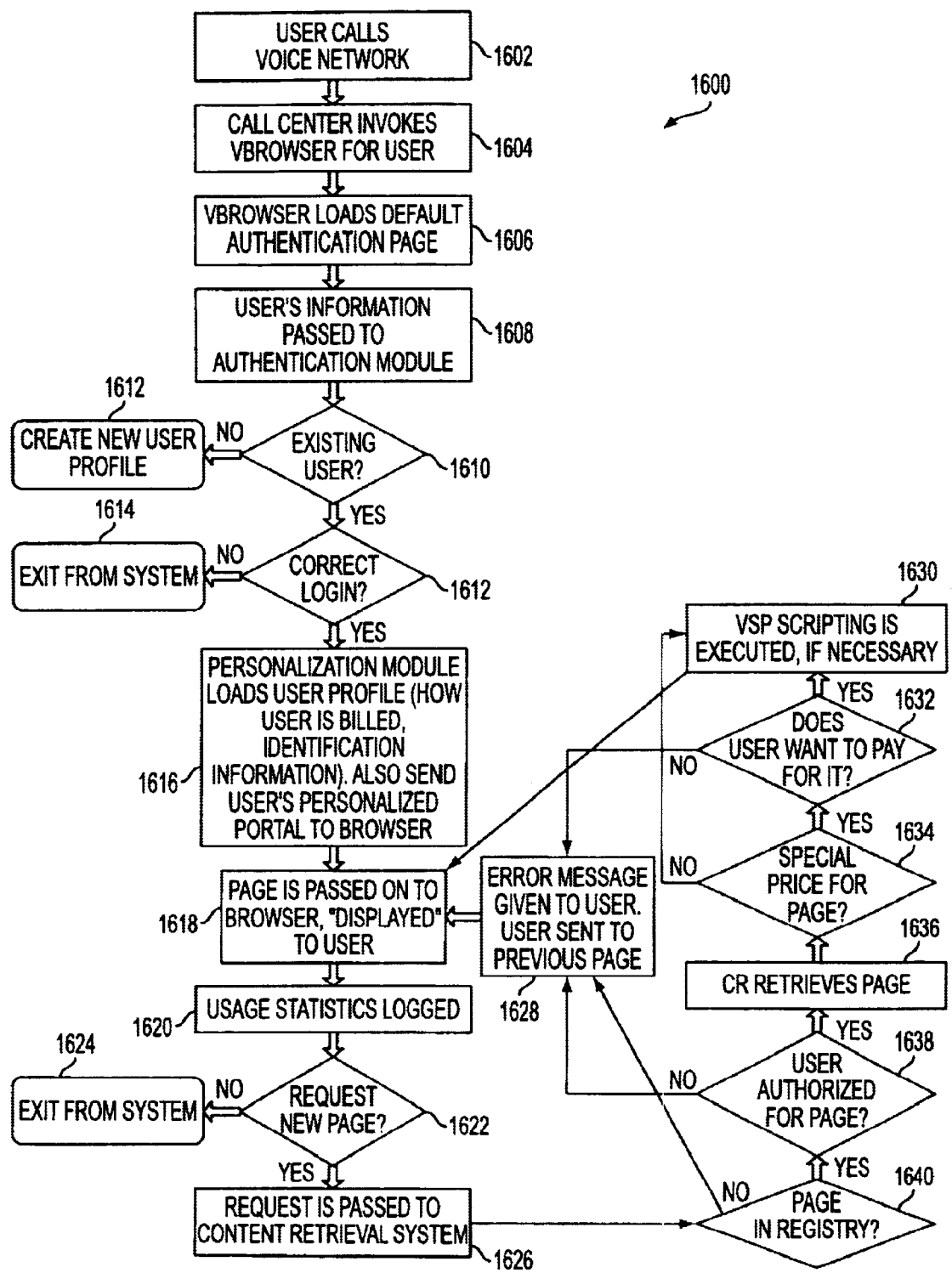
FIG. 16 depicts a flow diagram of call processing according to an embodiment of the present invention.

The functionality and relationship between these modules is provided in more detail below. An overview of the functions provided by these modules is provided with respect to FIG. 16. FIG. 16 depicts a method 1600 of operation of the embodiment of FIG. 7. In this system, in step 1602, the user calls the VNAP and the call center 28 receives the call. In step 1604, the call center 28 invokes the voice browser 35. In doing so, a browser manager provides a channel identification to the call center to identify the channel of the call. Next, in step 1606, the voice browser 35 loads a default authentication page, and "displays" it to user, where the user is prompted for login and password to authenticate the user. In step 1608, the user's information is passed to authentication module 45 which determines in step 1610 whether the user is a current user. If not, then the user is prompted in step 1612 to create a new user profile, as described herein. If the user is a current user, then the authentication module 45 determines whether the user's login and password are correct. If not, then the system, in step 1614 exits.

If so, then in step 1616, the personalization module 40 loads the user profile, including information about how the user is billed, identification information, etc. The voice browser also stores the user's information in its session information for later use. In step 1618, the VPage requested by the user is provided by the call center 28 to the voice browser 35 and displayed to the user. In step 1620, usage statistics regarding the retrieval are logged in the user statistics database 82. In step 1622, the user may request a new page. If not, the in step 1624, the user exits the system.

If a new page is requested, then in step 1626, the user request is passed to a content retrieval system (here, voice server 43). If the VPage requested in the VPage registration system (in step 1640), then in step 1638, the authorization module determines whether the user is authorized for that page. If not, then an error message is generated in step 1628 and the user is returned to the previous page. If so, then the content retrieval retrieves the VPage in step 1636. Next, the system determines whether there is a special price or authorization necessary to access the desired VPage (e.g., more than one credit for the VPage or a separate subscription required). If not, then VNAP scripting is executed if necessary to generate the VPage (step 1630) and the VPage is passed to the voice browser and displayed to the user (step 1618). Scripting includes substitution of personalized values for the particular user into the VPage. If the user does not desire to pay (determined in step 1632), then the error message is generated (step 1628).

Call center 28 in this embodiment may cooperate with the voice browser 35, a speech recognition module 39 and a text to speech module 37. Voice browser 35 acts as the interface between the caller and the voice server 43. It tracks information flow during the caller's session by accepting caller requests, interpreting them, passing them onto the server and returning the relevant voice pages to the user.

Voice browser 35 interfaces with call center 28 to handle TTS (text to speech) processing through interaction with TTS module 37. It also determines the voice content that is desired (such as determining the VCode or VName requested). Voice browser 35 thus translates voice input into specific instructions that the appropriate TTS engine understands. It may also pre-fetch certain VPages based on certain criteria. Also, if a VPage presents menu options, voice browser 35 generates spoken text to present to the user to choose from. Voice browser 35 also transfer control to different segments of a VPage depending on what menu options the user picks.

On the input side, voice browser 35 deals with DTMF (touch tones) and spoken words, by interacting with an Automated Speech Recognition (ASR) platform to get back spoken words as inputs as described in detail below. In general, however, ASR relies on grammars and voice browser 35 interacts with ASR to track the scope of grammars by switching grammars and adding and removing words from the grammar. Voice browser 35 may also be responsible for receiving input to complete variables presented to users based on pre-stored variable options. Variables, like grammars have a scope. For variables, this scope is tied closely to a namespace. Voice browser 35 manages variables across separate namespaces and keeps track of when a namespace has gone out of scope, to prevent the list of variables from keeping around data that is no longer relevant.

For each menu option created in a VPage dialog, content providers assign a transition command to allow the user to move from the parent dialog to the child dialog. Voice browser 35 interprets inputs from the user to effectuate those transition commands as well. Transition commands along with voice names and voice codes constitute the inputs into the Voice Browser. Voice browser also keeps track of what inputs are globally available and what inputs are local.

Also, voice browser 35 handles standard control flow options, such as conditional execution (typically an if statement), and transfer of control. Therefore, voice browser 35 may comprise an expression evaluator to evaluate the truth of conditional statements, and the ability to transfer the user to appropriate points within a page, and outside to other pages. In order to leverage existing, widely used technologies, such as CGI and HTTP, voice browser 35 may send the variables it has collected to a site with either the POST or GET http methods.

Additionally, voice browser 35 may make calls to outside functionality, in other words, use some form of RPC, such as the SOAP protocol, for example.

Voice browser 35 may interact with a speech recognition module 39, such as an automated speech recognition (ASR) platform, to interpret inputs from the user via voice commands. In one embodiment, the ASR utilizes grammars that limit the number of possible choices that are recognized. Every input received by the VNAP system is matched to the elements of a grammar to see if it is a legitimate reply. At least two types of grammars may be used—static and dynamic grammars. Static grammars are the most basic elements of a speech recognition application. They establish the framework for how a given voice input should be processed. During a dialog, if the only legitimate transition command is a date, a date grammar is provided to match the caller's response and assign a meaning to it.

Dynamic grammars are created on-the-fly. A restaurant's menu may have many static items for static grammars, but may also have specials for which dynamic grammars are used. When a user wants to order the special, his speech input may be checked against the dynamically created grammar.

Figure 17:
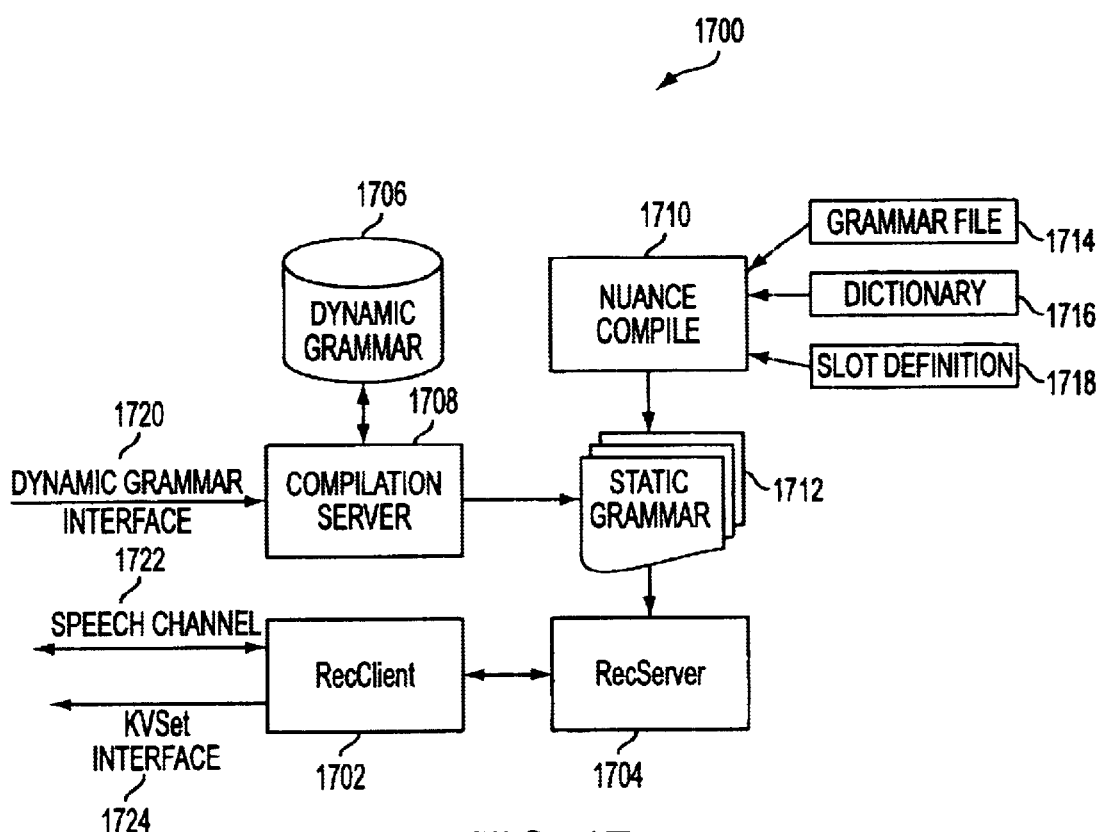
FIG. 17 depicts an embodiment of speech recognition modules according to an embodiment of the present invention.

According to one embodiment an ASR system as depicted in FIG. 17 may be used. A Nuance Communications system may be used, for example. The ASR 1700 comprises a RecClient 1702, a RecServer 1704, a dynamic grammar repository 1706, a compilation server 1708, a compiler 1710, static grammar 1712, grammar files 1714, dictionary files 1716, and slot definition files 1718. Also, a dynamic grammar interface 1720 may be provided. The RecClient 1702 outputs a speech channel 1722 and a KVSet Interface 1724.

A grammar file 1714 comprises a text file (e.g., written in Nuance Grammar Specification Language or called Java Speech Grammar Format) that contains information about what words are recognized by the application and what values to return. A Nuance Grammar Specification Language specification may be used to create this file.

Dictionary 1716 may comprise a set of words in a given language and their associated pronunciations. Slot definition 1718 may comprise a text file that specifies the slots/variables that may be filled by sentence processing. Compiler 1710 comprises a onetime executable that takes the grammar file, the dictionary, and the slot definitions and compiles it into a static grammar file 1712 that may be utilized by the RecServer 1704. The static grammar file may contain pre-defined places where dynamic word/words may be inserted at run-time.

Dynamic grammar repository 1706 may comprise a file system or relational database that holds compiled dynamic grammar phrases for insertion into the static grammar. Compilation server 1708 may comprise a server process that takes grammar fragments and compiles them into binaries that are stored in the database. Typically each dynamic words take 40–60 bytes of storage. RecServer 1704 takes the compiled static grammar 1712 and user input and converts it into a RecResult.

RecClient 1702 is a process through which the speech channel interfaces with a RecServer. Multiple RecClients may be running on different machines across the network. The operation of these elements may be according to Nuance Communications specifications and modified for the particular VPages and content output by the VNAP.

Voice browser 35 also cooperates with a text-to-speech module 37. Text-based voice content may be passed from a VPage to this module along with personalized speech settings from personalization module 40 to convert text into speech and return the voice content back to voice browser 35 for delivery to the user. Such content is preferably delivered as a monaurel, sampled at 8 KHZ (telephony standard), with fidelity on the order of 8 bits per sample.

Content retrieval module 32 accesses VNAP database(s) 18 to retrieve a VPage and pass that to voice browser 35 to be presented to the user. Once a VPage is located, permissions are passed onto authentication module 45 and billing information specific to this page is passed onto billing module 46. The VPage is then retrieved from a source also specified in the VCode registration system 24. The content source may be from an internet source, a file server or a database. Also, when VPages reference a standard audio clip, the audio content may be retrieved directly from the network (direct network access) by this module. To speed up information retrieval, content retrieval module 32 may also cache frequently hit VPages. The cache may be searched before the VCode registration module 24 when retrieving a new page.

Through the use of the present system, voice and other content may be delivered on demand to users at the time they desire and in the manner in which they desire, without sitting at a computer.

To illustrate the process and use of this system, an example may be provided. In this example, a Mr. Bean desires to access a VNAP system in order to increase his enjoyment of the Smithsonian Institute's art gallery. As described above, Mr. Bean may have already subscribed to the VNAP service through a subscription interface module. And is now ready to take a cyber tour of the art gallery using a mobile telephone. As shown in FIG. 9, upon approaching a particular painting in the art gallery, Mr. Bean is provided the opportunity to contact the blackbird VNAP in order to receive information about the paintings in the gallery. Labels are placed at the bottom of each painting in the Smithsonian to enable the user to easily identify the VCode and VName for the particular painting.

Accordingly, the following sequence of events may represent an example of a dialog between Mr. Bean and the VNAP system (here called Blackbird).

1. Mr. Bean notices the labels on each of the paintings in the hall. He dials the 1-800-BLACKBIRD number to enter the Blackbrid voice-network. This starts his session.
2. Mr. Bean enters the five-digit domain-code for the Smithsonian Art Gallery. (He could have just asked to be connected to the "Smithsonian Art Gallery.")
3. His personal cyber-guide on Blackbird welcomes Mr. Bean to the Gallery, asks him to specify his language preference and then instructs him to enter the item number (this is the same as the VPage identifier).
4. Mr. Bean enters the four-digit item code or says "Water Lilies."
5. Blackbird starts reciting the details on Monet's Water Lilies.
6. Due to static, he misses some of the information and requests Blackbird to "Rewind" and "Start" from any point he wants.
7. Blackbird finishes up with Monet's details.

Blackbird: Would you like to buy a poster of "Water Lilies?"

Mr. Bean: No.

8. When he walks over to Van Gogh's "Sunflowers," Mr. Bean decides he doesn't want to hear more about Monet and asks Blackbird to "Stop" and take him to "Sunflowers."

9. After listening to the explanation, Cyber-Guide prompts him again for a poster purchase.

Blackbird: Would you like to buy a poster of "Sunflowers?"

Mr. Bean: Yes.

Blackbird: Would you like a small, regular or large size poster? Say "help" if you want details on these sizes.

Mr. Bean: Large.

Blackbird: Will the poster be in the name of John Bean?

Mr. Bean: Yes.

Blackbird: Would you like to use your American Express Gold?

Mr. Bean: No.

Blackbird: Would you like to use your First Union Visa?

Mr. Bean: Yes.

Blackbird: Thank you very much for your transaction, Mr. Bean. You can pick up your poster from the Smithsonian Gift Shop on your way out. For mailing options, please say "MAIL" or press 1 now.

Mr. Bean: Continue.

Blackbird: Would you like to link to other museums in Washington D.C. that have the works of this artist?

Mr. Bean: Yes.

10. Mr. Bean navigates in different museums and finds out what paintings of this artist they have and obtains directions to the ones he is interested in.

Use of the system by Mr. Bean provides numerous advantages. Mr. Bean is able to get into the voice network by simply dialing a telephone number on his cell phone. There is no need for additional software or hardware to retrieve information. The connection process makes no assumption about Mr. Bean's background, other than the ability to dial and speak or input into the phone using the touch tone keys. The system is temporally and spatially flexible. He is able to access information at the right time and in the right place. As he walks by Monet's Water Lilies, he is listening to a cyberguide talk about this particular painting. The system does not require waiting time involved and information retrieval or obligations to be in a specific location. For example, requiring a room with a computer and a network jack. Further, the system is reactive to Mr. Bean's inputs for more information or to purchase items relating to the painting. He is able to manipulate the session, make requests, and receive real time response that is typical of human interactions. He is also able to stop and restart the audio information flow, as well as rewinding to hear specific points again. Words like stop, rewind, and skip are parts of a global command suite that is activated in every voice page in the VNAP system. The customer is able to get even more value out of a cyberguide than he would from an actual tour guide by purchasing a poster. Conducting transactions is beyond the job description of an actual tour guide, who is responsible for walking visitors around and giving them detailed information on the items. By incorporating transactions in the job description of the cyber tourguide, the VNAP system adds value to the customer's experience.

The system is also personalized to the customer. At the point of transaction, the customer need not specify his name, his credit card number or his mailing address. This information has been provided as part of the subscription profile, which the user created when he subscribed to the VNAP system. The VNAP system recognizes and authenticates his cellular telephone number at the beginning of the session and retrieves his credit card information as he is purchasing the poster. At the subscription phase, the customer specified all credit cards to which purchases for VNAP products would be charged. During transaction processing, the customer is able to choose from the selected credit cards to make the purchase. Alternatively, or in addition thereto, the customer may input only one credit card, and all purchases using the VNAP system would be charged to that one credit card.

Content providers benefit from the system by being able to extend their content out to anyone who has access to a telephone. The content may be displayed in any language, any order and any pace to suit the needs of the visitor. This flexibility, along with the ease of use, increases the number of customers that the content provider can reach immensely. In order to achieve the same level of service with regular tour guides, as in our Smithsonian example, the Smithsonian would have to employ hundreds of people to serve each visitor personally which is a costly and redundant prospect. Content providers would benefit in various areas to generate revenues. In the Smithsonian example, the Smithsonian or a museum benefits by transitioning from using tour guides to cyber guides, thereby reducing or even eliminating the costs associated with tour guide personnel. Also, the museum may generate revenue by charging the visitor on a permanent or other time based or per page based basis. Also, the museum executes transactions through the cyber guide and asks visitors to pick them up from the gift shop. This has several implications. People who do not have time to go into the gift shop can order items on the voice network and get them mailed to their home address. And also, by attracting visitors into the gift shop for pickups, more revenue may be generated by the users having visited the gift shop and purchasing additional items. Further, the system is easy to deploy.

In order to create a VPage, the content provider creates a menu structure on the content creation interface and fills in the structure with audio or text content. Audio content can be displayed as it is and a text to speech engine may be used to convert text into voice. Modifications to the content may be made any time over the phone by individuals with administrator privileges for that particular content provider. In this way, the content provider may update content easily when a new item arrives or the information on an item becomes obsolete. The system of the present invention provides a mechanism of standardizing the service that content providers' visitors receive. Ordinarily the quality of service provided by tour guides, for example, may vary along time and among different tour guides. By offering the same cyber guide experience to all customers, the content provider ensures a more consistent customer experience thereby improving the changes for customer satisfaction.

Figure 5:
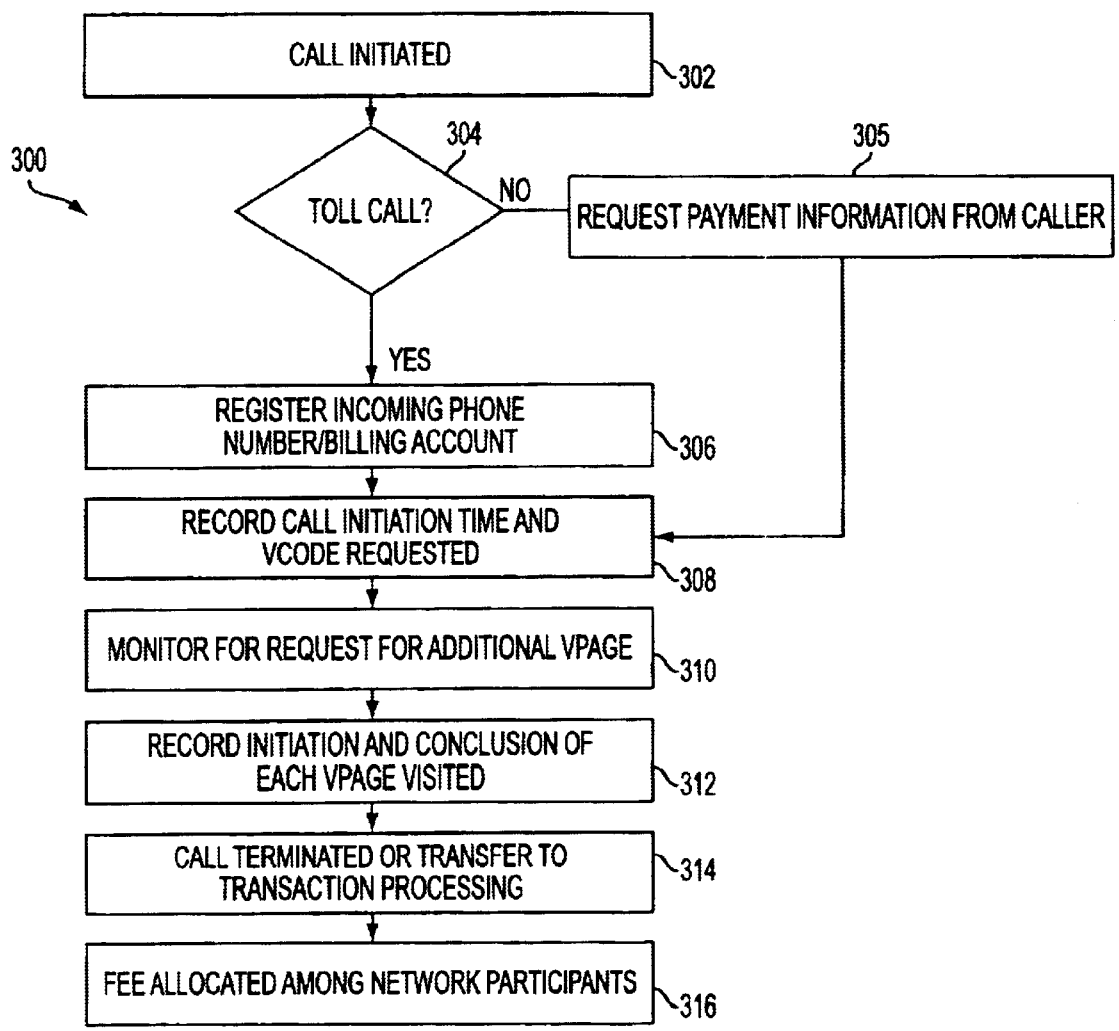
FIG. 5 depicts a schematic diagram of a method of allocating fees collected from users to content providers according to an embodiment of the invention.

A method of monitoring usage for billing purposes as method 300 is depicted in FIG. 5. In method 300, the first step is the initiation of the call in step 302. Once a call is initiated, VNAP system records the phone number through a phone number recognition system, or requests the entry of the phone number or account number from the user. If in step 304 it is determined that it was a toll call, then the processing continues to 306. If it is a toll call, the fees received by the VNAP may be based on the toll rate charged. If, however, the billing is to be set up through a credit card or other means of payment, then processing passes to step 305 to request payment information from the caller. Any method of providing payment over telephone that is acceptable within the area in which the system is operating may be used, including credit card, electronic checks, certificates, or an account through pre-registration system 47. If the call is a toll call, then in step 306, the incoming phone number and billing account are established and the time of the call is recorded in the database associated with the billing module. After processing in either step 305 or 306, in step 308, the call initiation time and the VCode requested are specified. The VCode is identified in order to identify and allocate the fees received amongst the various entities entitled to a portion of the fee, including the VNAPs, content providers and/or the VCode host sites. In step 310, the billing system monitors for the request of an additional VPage. And if such a page is input in step 312, the initiation time and conclusion time of each VPage visited are recorded. Next, in step 314, when the call is terminated or transferred to transaction processing, then the billing period is terminated. The time that the billing period is terminated is recorded in the database and then in step 316, the fee is allocated amongst the VPage owners visited, the VNAP, the VCode display hosts, and/or others according to a predetermined arrangement.

As discussed above, any number of billing and/or fee arrangements may be used to generate and distribute revenues amongst the various VCode participants within the system. For example, a flat fee may be paid to each of the VPages visited, a pro rata fee based on the period of time a user participates in the system may be provided, etc. Each VPage may then allocate the fees it receives to the various VPages referenced therein according to a predetermined schedule and each VPage may then accordingly allocate fees to each VPage it has participating within its menu system based on a predetermined schedule. As such, content providers are given an incentive to participate because they receive fees for visitation to their VPage. Further, various entities may host VCode displays. Such entities may receive a portion of fees. The subject about which content is posted may also receive fees based on access to content.

Also, content provider may assign fees (either dollars or units) for their VPages. The VNAP then receives either a fixed amount from VPage revenues or an amount at a fixed rate that is directly proportional to the revenues of the content provider.

Further, in all of the embodiments discussed, the fees charged/paid may vary according to various factors, including the time of day, the size of the VPage, the amount of data accessed within any VPage or VBook, or any other variable.

One example of how a content provider may generate revenue is provided with respect to FIG. 13. FIG. 13 depicts a dialog tree for a content provider (named Sue) for a voice-based restaurant guide. Sue is a recent college graduate, who has spent much time traveling in the East Coast and exploring different restaurants. To take advantage of her detailed restaurant evaluations, she develops a new business plan that involves putting her content online. She thinks that instead of buying a city-based guide for every single location, people might prefer to have a single source for restaurant consultation wherever they go. As a starting point, Sue picks Boston and develops content for restaurants in Boston. Sue subscribes to a VNAP system, such as one named the Blackbird system. She also acquires a VPage and VCode for "Sue's Restaurant Guide." Going through the content creation interface numerous times, Sue creates VPages for 40 different restaurants in Boston. For each VPage, Sue uses the dialog structure as depicted in FIG. 13. In addition to each restaurant VPage, Sue also creates a main VPage such that users can search restaurants by location, name, food type or cost. She organizes a separate dialog tree structure for these menu options. Sue chooses to charge 20¢ for each minute a user spends listening to her content. In order to facilitate content distribution, Sue orders two kinds of brochures: one main brochure that lists all the restaurants along with their VCodes and VNames as well as other regional brochures that list only the restaurants that correspond to a particular region. Once she is done designing and organizing her content in her VPages, Sue needs to distribute her content and make sure it reaches many users. Since Sue has not yet acquired a reliable reputation, she needs to distribute her content via third parties, which have acquired a solid reputation. Sue realizes that content distribution is as important as content creation to be successful on the VNAP. Sue hands out her brochures to travel agencies, travel guides, newspapers, magazines and local businesses. She also gets in touch with key VPage owners to acquire a link out of their VPages. To do all of these, Sue offers commission to some of these third parties. Various users start to find out about Sue's Online Restaurant Guide. Sue starts generating revenue. Once she has a consistent user base, Sue may choose to reduce or eliminate third party involvement partly and generate even more return. Sue starts the restaurant guide up in other cities and using different languages.

In this example, each subscriber may be subject to a credit-billing model. Each minute spent on a voice page by default may cost one credit, which is a direct payment to the Blackbird VNAP. With the default setting, content providers do not receive any income out of their voice pages. The dollar value of one credit may be fixed, although subscribers who plan to purchase many credits at once may receive discounts for the credit rates.

Figure 14A:
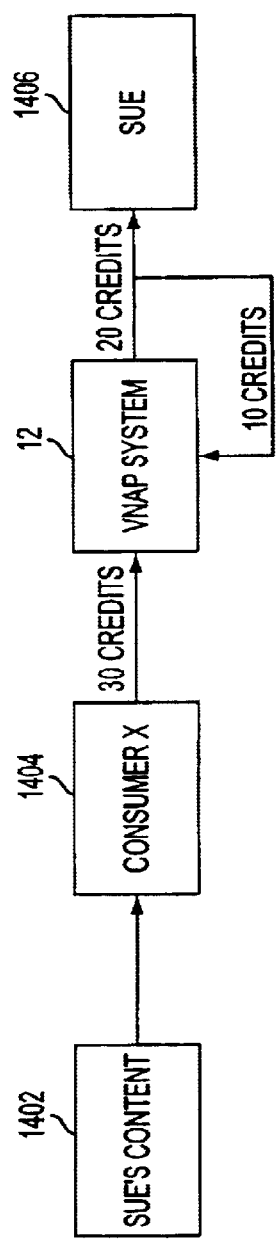
FIG. 14a depicts a flow diagram of revenue generation in VNAP system according to an embodiment of the present invention.

If content providers, like Sue, want to be compensated on a per minute basis, they declare their charge per unit to be more than one credit as described above with reference to FIG. 10(a). Subscribers may receive a single bill from Blackbird for the content they retrieve on the VNAP. The VNAP takes out its share that is equivalent to one credit per minute. The rest of the payment may be directed to the content provider. A payment example is depicted in FIG. 14(a).

If Sue is charging three credits per minute when Mr. X spends 10 minutes per pay period listening to Sue's restaurant evaluations, Mr. X is charged for 30 credits for Sue's content only. The VNAP system sets aside one third of this payment for network compensation and sends the rest to Sue. Thus, Sue's content 1402 is provided by the VNAP system 12 to consumer X, who pays the VNAP system 12 thirty (30) credits. The VNAP system 12 then pays Sue (1406) 20 credits and retains 10 credits. With the VNAP system 12 as the central billing mechanism, subscribed users receive one billing statement from that VNAP. The mechanical details are taken care of at this central billing unit so that content providers collect their shares every pay period without having to worry about billing details.

According to another embodiment, content providers may resell their VPages for use by other VPages. A content provider may agree to sell his content to another content provider. This is called content resale. A provider, who uses content that belongs to someone else, may share his revenues from that content with the original owner. The rate for sharing is specified by a content owner as he creates the voice page. Content that is duplicated with the permission of the owner is called derived content.

The VNAP system may hide the details of resale calculations from the content provider. Incorporation of the resale ability into the system does not change anything from the point of view of users or content providers. The VNAP's central billing unit may split the payment such that all derived content providers and content owners are compensated properly.

Figure 14B:
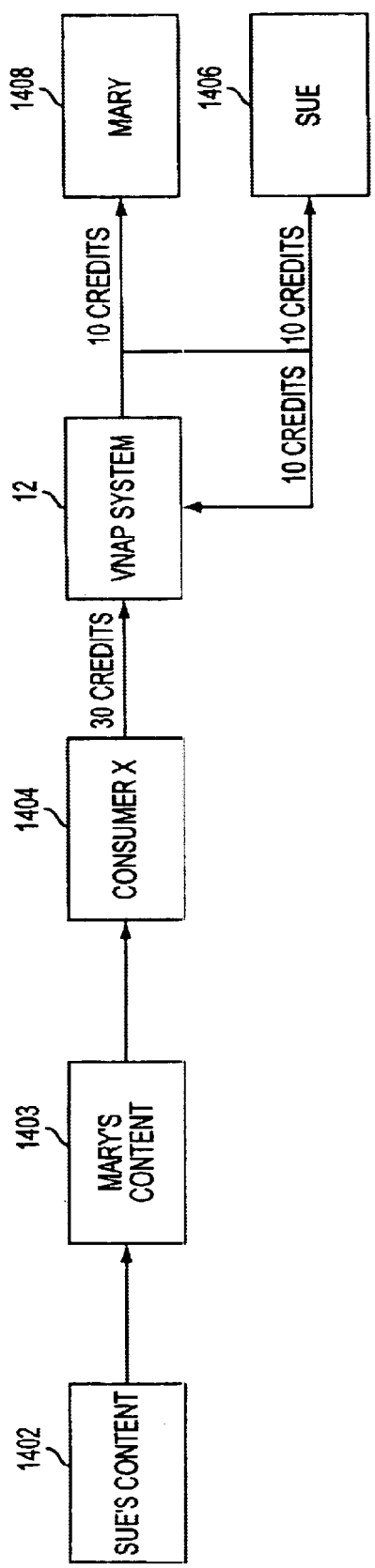
FIG. 14b depicts another embodiment of a flow diagram for revenue generation in a VNAP system according to the present invention.

In the example above, Sue may resell her content for additional revenue. Seeing how successful Sue has become with her Blackbird restaurant guide, Mary hopes to use part of Sue's content in her Blackbird hotel-guide for hotel restaurant evaluations. Sue agrees to do this only if she receives half the share, and she specifies her resale rate to be 50% for each of her voice pages. Just like Sue, Mary charges users three credits per minute. This time of those thirty credits, 10 go to Blackbird, 10 goes to Sue as the original content owner, and the remaining 10 credits go to Mary as her revenue, as depicted in FIG. 14(b).

Figure 15:
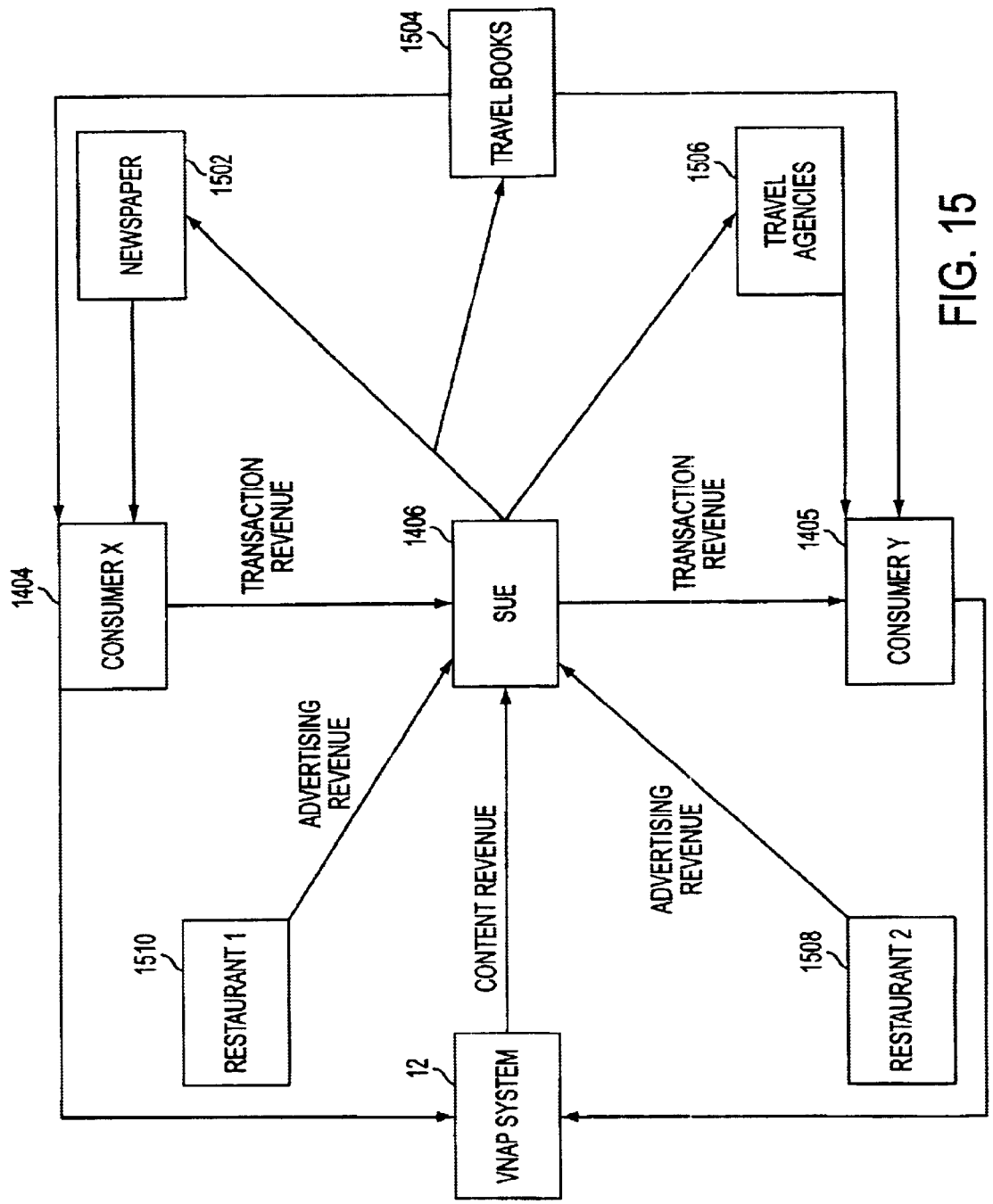
FIG. 15 depicts an overall flow diagram of revenue generation according to another embodiment of the present invention.

Accordingly, Sue's content 1402 feeds Mary's content 1403. Mary's content is provided to Consumer X 1404 who pays VNAP system 12 thirty (30) credits. VNAP system 12 pays Mary and Sue 10 credits and retains 10 credits. An overview of Sue's revenues and costs is depicted in FIG. 15.

Sue's costs consists of the commission she pays to third parties for distributing her content. Through these third parties Sue's content reaches her user base. Users make their payments to Blackbird for visiting Sue's voice page. Blackbird takes its share from the payment, adds derived content returns and sends Sue her content revenue. Sue also receives direct revenue from users through transactions and advertising revenue from restaurants.

In order to distribute her content, Sue used third parties such as travel agencies 1506, travel books 1504, newspapers and magazines 1502. The third party selection is solely based on what channels Sue thinks will best accommodate her content. Therefore, she may pick and agree on a commission rate for each distribution channel she is working with and may distribute parts of her total revenues to all the distribution channels. Content revenue is the amount the VNAP system 12 (here Blackbird) returns to the content provider. Content revenue is what is left after the network charges are taken out and the resale shares are added to the subscriber payments to Blackbird for Sue's VPages.

Revenues generated by conducting transactions with users are provided from customers 1404 and 1405. Sue may ask her users if they want to buy a written version of her restaurant guide. If they agree, she could directly charge her content users and mail them a copy of her booklet. The VNAP system 12 may have little or no involvement in this type of revenue flow.

When Sue makes reservations at restaurants for her users, she is helping restaurants generate revenue. For each reservation she makes, Sue may collect a share of the restaurant's profits, defined by a preset commission rate. The Blackbird infrastructure facilitates transaction revenue generation by providing interactive and personalized VNAP services. This revenue, from restaurants 1508 and 1510, may or may not be shared by VNAP system 12 according to various embodiments of the present invention.

According to another business model, users may access the VNAP free of charge. Revenue may be generated through advertising or by charging VPage providers to make their content available. As discussed above, VAds may be included in VPages and the system may generate revenue from these VAds. The Ads selected may be customized to the content generated in the VPage. The distribution of the advertising fee may take various forms. An advertising fee may be paid to the VNAP when the VNAP includes an advertisement in a VPage (even if it does not notify the content provider). Also, an advertisement may be paid to the voice content provider when that content provider selects to include an ad in its VPage. Ad revenue may also be shared when the VNAP acts as an advertising agent to match advertisers with content providers and the content provider agrees to include an ad in its voice page. Also, premium VPages may charge users a fee but general access to the system may be free. For example, a yellow pages site may provide directory lookups for free but charge the user for turn-by-turn directions. Additionally, the VNAP may charge both the users and the VPage providers. Other permutations of payment and receipt may also be provided amongst the various participants in the system.

Figure 6:
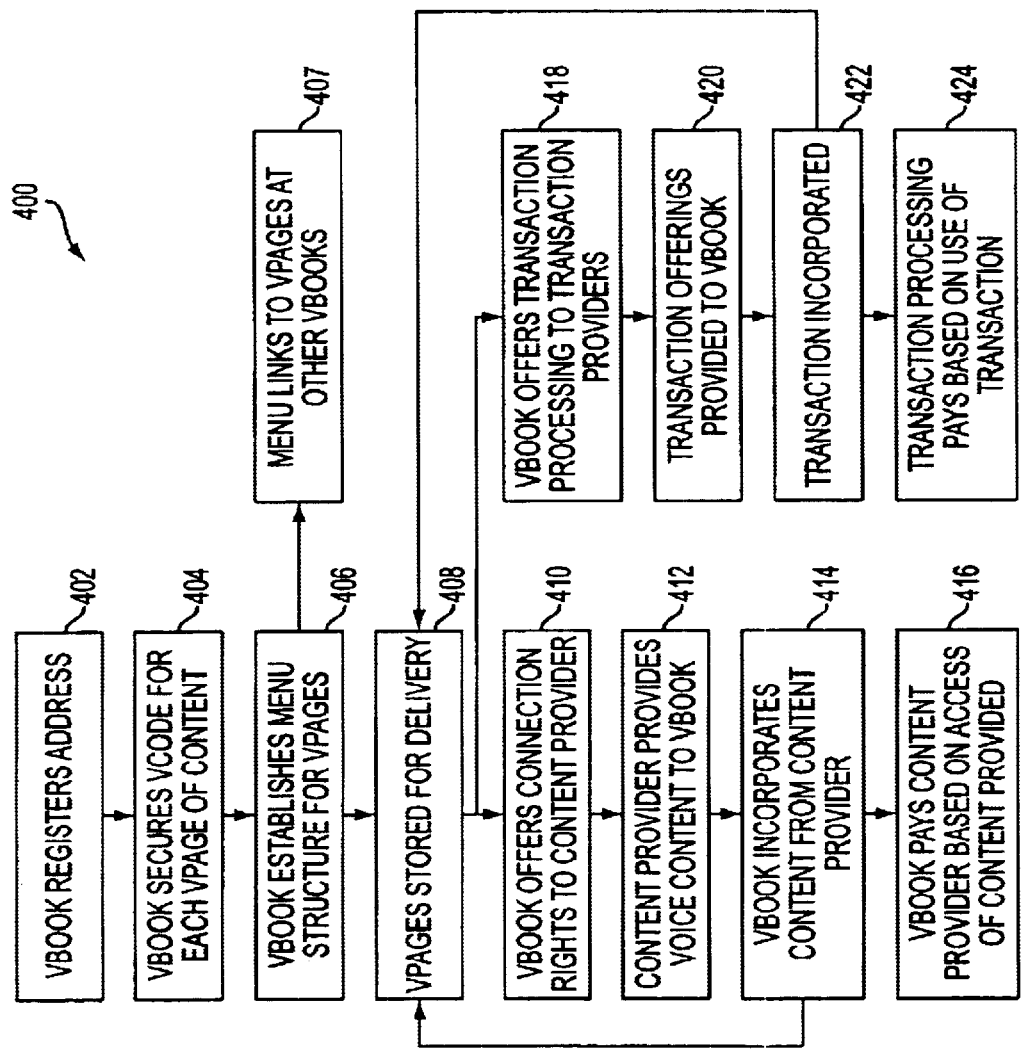
FIG. 6 depicts a schematic diagram of a method of providing content and transaction processing for VPages according to an embodiment of the invention.

FIG. 6 depicts a method for content providers to provide content to be included at one or more VPages and then provide it as VPages within the VCode system. In step 402, a content provider that desires to participate in the VCode system registers an address on communications network 20 for a VBook, i.e., one or more VPages. The address identifies the location within the network where VNAPs can locate and retrieve files from the particular content provider. VPage registration system 24 may be used to store a unique address for each VPage within the communications network. A uniform registration system may be provided throughout the VCode system to avoid duplication and other problems associated with having multiple registration systems. Also, multiple registration systems may be provided, however, a synchronization method may be utilized to ensure that unique addresses are issued by the various registration systems. For example, each VPage registration system may have a series number that it issues so that the number or address of the VPage never conflicts. In step 404, the VBook secures a VCode for each VPage contained in that VBook.

Next, in step 406, the VPage establishes a menu structure for the VPages to be operated by the VPage organization system 56. Specifically, each VPage may include a reference to one or more other VPages, some of which may be from that VPage, and others of which may be from another VPage. For the VPages within the VPage, an organizational structure may be established in order for the VPage to be able to locate and store the VPages in a quick and efficient manner. In step 407, the links to VPages at other sites may be recorded so that VPage may pass along the location of a referenced VPage at another location when a user selects an option addressing that VPage. In step 408, VPages containing voice content are stored on a database associated with the VPage for later delivery. Next, step 410 or step 418 is executed. In step 410, the VPage offers connection rights to content providers. As part of this process, content providers may contract for payment of fees for providing information based on the amount or per usage of the VPage by users. In step 412, the content provider provides voice content to the VPage which in step 414 is incorporated into one or more VPages. The VPage then created is stored for delivery in step 408 and the cycle continues. Finally, in step 416, the VPage may pay the content provider based on the access of the content provided. Alternatively, in step 418, the VPage offers transaction processing to a bunch of transaction processors. In step 420, the transaction offerings are provided to the VPage and in step 422, the transactions are incorporated into one or more VPages which are then stored for delivery in step 408. Finally, in step 424, the transaction processing companies pay a fee back to the VContent provider and/or VNAP based on the usage of the transaction.

In one embodiment, a content provider may process transactions for a second transaction content provider. These two content providers may share the revenues generated by the transaction. For example, the Washington Post VPage may sell Yankees T-shirts to users as part of a Yankees VPage reporting on a recent game. The Post and one T-shirt seller may share the revenues from the sale of that T-shirt.

In one embodiment, transactions processed through the system of the present invention may use the credit card information in the user's profile. The system may also use any other form of payment specified by the user either in the user's profile or specified by the user on-line, including as bank account, electronic check, wire transfer or other payment. Additionally, as discussed above, the VNAP system may operate through charging credits for VPages. These credits may be purchased by the user for different amounts, for example, depending on the volume purchased. Fifty credits may cost twenty dollars whereas five hundred credits may only cost one hundred fifty dollars. In this embodiment, the credits may be used to complete a transaction as well. For example, a site may provide for movie ticket purchasing and the user may pay for the movie tickets using VNAP credits purchased from the VNAP system. The content providers and transaction processors are then paid based on the value of the credits received by the VNAP.

For the use of the system described, a business model based on sale of information for provision over a voice network is created. Users pay a VNAP who provides access to VPages with a vast amount of information that is deliverable on demand based upon the simple input of a VCode associated with a product, a service, a site, or any other object or thing about which a user may desire information. Further, because of the penetration in mobile phones throughout the world, users may access this system without requiring purchase of new equipment and therefore an improved system of information on demand as requested is provided.

Various examples of how this system may be used are provided below.

Figure 19:
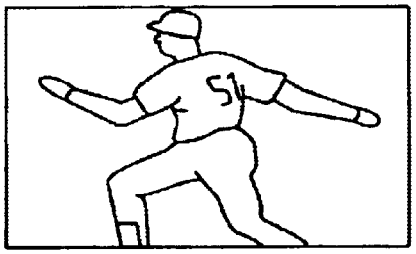
FIG. 19 depicts an example newspaper incorporating VCodes according to an embodiment of the present invention.

Jack is a subscribed Blackbird user. Blackbird services have become a part of his daily life due to the voice network incorporation into newspapers. Every morning, Jack skims through the Washington Post and pinpoints the articles that he needs more information about. A typical Washington Post page in this example may look like FIG. 19.

Jack missed the Yankees-Boston game and is ready to find out all the details. He connects to Blackbird and enters the VCode for the relevant article (V 38373-272). Once he dials this number, Jack is on the Washington Post VBook and to navigate between articles, he only needs to dial the three digit VPage identifier codes. The dialog between Jack and the VNAP system 12 may be as follows:

Blackbird: Would you like to replay important sections from the game or hear interviews?

Jack: Interviews.

Blackbird: Would you like to hear an interview with Bernie Williams?

Jack: Yes.

Upon this request Blackbird replays an interview recording with Bernie Williams. It is a five minute long interview and Jack just needed to hear the first three minutes.

Jack: Skip.

Blackbird: Would you like to buy a Yankees T-shirt or hear an interview with the Yankees Manager, Joe Torre? Press 1 for a T-shirt. Press 2 for the interview.

Jack: I would like to buy a t-shirt please.

Blackbird: Would you like a blue, black or white t-shirt?

Jack: Blue.

Blackbird: Would you prefer short-sleeves or long-sleeves?

Jack: Long-sleeves.

Blackbird: What size T-shirt would you like? Our sizes are small, medium, large and X-large.

Jack: Large.

Blackbird: Can I charge this to your Mastercard?

Jack: Yes.

Blackbird: Can I mail the T-shirt to your house or would you like it pick it up?

Jack: Mail to my house.

Blackbird: Thank you very much for your time. You will receive your T-shirt in a week.

Jack may reply to Blackbird in full sentences. The speech recognition technology described herein parses the sentence to identify words that are actual transition commands for different menu options. For instance, when Blackbird asks Jack whether he wants his T-shirt to be mailed or picked up, the answer is parsed to look for the word "mail" or "pick." If Jack had not used either of these words, Blackbird may rephrase the question by giving Jack the touch-tones for his options.

At this point, Jack may desire to move onto a different article. He dials 278 to connect to the information on "The Game."

Blackbird: Place a bet and win $1,000. Guess the scores for tonight's game between LA Lakers and Chicago Bulls.

Would you like to place a bet now?

Jack: No.

Blackbird: Would you like to get tickets for this game or connect to expert evaluations for both teams?

Jack: I would like to listen to evaluations.

Blackbird brings up fragments of interviews with sports columnists and coaches.

Jack hangs up and keeps looking through the Washington Post. If he calls Blackbird again, he will directly be connected to the Washington Post VBook. In one embodiment, the VNAP remembers the last VBook visited and connects to it in the next call so that connections that are cut off accidentally or temporarily return to where they were. The sports page scenario for Jack may be repeated with the business page, classifieds, etc. Jack may dial the stock market VCode to retrieve detailed information about specific companies or he can dial the VCode associated with a car sale in the classifieds to get more information from the car owner himself.

In this example, Jack benefits by receiving a wide variety of information at his own discretion. He can manipulate his own Washington Post experience the way he wants. Jack can conduct transactions through his newspaper without having to go to a shop. Jack is also able to retrieve real-time voice information like interviews, parts of games, concerts, etc.

The Washington benefits because it may not pay to provide VPage content. Washington Post may assign a minimal charge for extra information retrieval on the VNAP. This way it can generate additional revenues by attracting readers to the voice pages using lotteries, live recordings, etc. The VNAP system enables Washington Post to carry out transactions. In most cases, Washington Post may be some other content provider's third party distribution channel. This way Washington Post may acquire parts of transaction revenues as well as referral fees for directing readers to specific voice pages. (i.e., VPages of classified ad owners). Washington Post delivers more information without actually printing it. This allows better allocation of resources for audio content that is normally converted to text and placed on a shelf.

In another example, Jack wants to buy new speakers for his stereo. He is not very familiar with his options so he goes to Stereo Store to look around and make a selection. In Stereo Store, every item has a distinct VCode and a VName associated with it. Before items are sold, the VPage for each item gives customers the sales pitch and detailed information on what distinguishes this item from others in the market. Once the item is sold, content on the voice page is automatically updated to contain personalized setup and warranty information. Ultimately, the same VPage may serve the customer both pre and post sales.

When Jack arrives at Stereo Store, he is very confused due to the huge variety of speakers. Jack may just go up to a speaker and dial its VCode directly to retrieve the information specific to that speaker. Instead, he dials 43956 to connect to the Stereo Store domain.

The dialog for this example may be as follows:

Blackbird: Hello Jack. Welcome to Stereo Store! What type of product can I assist you with today?

Jack: Speakers.

Blackbird: Do you have a budget constraint?

Jack: Yes.

Blackbird: Enter the most you are planning to spend on speakers.

Jack: $700.

Blackbird: Do you prefer upright, bookshelf or surround system speakers?

Jack: Bookshelf.

Blackbird: Do you want a subwoofer?

Jack: Yes.

Blackbird: Do you want a built-in subwoofer or separate?

Jack: Built-in.

Blackbird: Our top three recommendations are Platinum Reference Speakers, Polkaudio R300 and Aerial IOT.

Select one of these to locate them in Circuit city and retrieve information.

Jack: Polkaudio R300.

Blackbird: Polkaudio R300 is located in aisle three of the speakers section. Please say "Continue" when you find Polkaudio R300 and we will connect you to the info center for this speaker.

Jack finds the Polkaudio speakers. Now he asks Blackbird to continue. Blackbird links to the Polkaudio R300 voice page.

Blackbird: Welcome to the Polkaudio R300 Information Center. If you would like to have an engineer guide you about the technical details of the R300 speakers, press 1 or say "engineer" now. If you would like to talk to a customer who has used Polkaudio 300 before, press 2.

In this dialog, when Jack says "Continue," the domain page links to the Polkaudio R300 voice page. At this point, Jack may find out about all the product details on a level that he prefers. Talking to an engineer may give him the technical strengths and capabilities of the speaker. Talking to a previous customer may give him a more practical view.

After listening to his other options, Jack decides to buy the Polkaudio R300 Speakers. At this point Jack can either go up to the cashier to pay for his purchase or he can just pay for it on the phone through the VNAP system and setup a time for delivery. Jack may also do so on his way out, in his car or later.

If Jack has setup and configuration problems, he dials into the VNAP system. Now that this item is sold, the content is updated to include setup directions instead of sales information. It also includes links to other products that Jack purchased along with his speakers. The VPage, therefore, becomes a personal helper for Jack.

Jack can either go through the setup helper on the phone and setup his speakers or he can schedule a time so that a Stereo Store technician can come to his house and do it for him. If Jack has a specific question, he can leave a message and wait for a representative to call him back. If he forgot to buy a certain cable that is necessary for connections, he can order this piece. Jack can also navigate between different products that he has purchased. Stereo Store can design the content for its product pages such that the content answer most frequent customer questions.

The VNAP may also have VPages for service and warranty questions. If jack has problems with his speakers, Jack connects to his personalized Polkaudio VPage and inquires about the warranty. The dialog may be as follows:

Blackbird: Hello Jack. Your warranty has not expired yet. Are you having problems with your Polkaudio R300 Speakers?

Jack: Yes.

Blackbird: Would you like to troubleshoot online or would you like to get it repaired?

Jack: I would like to get it repaired.

Blackbird: Would you like someone to pick it up for an extra charge of $40?

Jack: No.

Blackbird: The nearest Stereo Store technical support offices around your house are 2345 Maple Drive and 3377 Randolph street. The one office close to work is 49 Lincoln Drive. Select one office.

Jack: 2345 Maple Drive.

Blackbird: Would you like to have directions to this office? Jack: No.

Blackbird: A technical support representative will call you from home or work within 24 hours to setup an appointment.

Therefore, the same VCode associated with the speakers helps Jack to make his choice at the point of purchase, go through setup at home and consult about warranty when the speakers are broken. This allows Jack to be a much more self-sufficient consumer. The domain page points Jack to the options that he is really interested in by narrowing down the speakers catalogue in light of Jack's conditions. This saves him the time of going through all speakers before he hits one that he likes. After the sales, Jack receives personalized information allowing him to navigate between the products he purchased and pulling out the nearest tech support offices to home and work.

The store benefits because it is better able to standardize the quality of service to all customers. The store is able to increase revenue by charging for the service on the phone. By providing relevant links from personalized product voice pages, Stereo Store may establish resale or referral alliances by other companies.

In another example, Jack is also subscribed to personalized and proactive intelligence agent, such as strategy.com provided by the assignee of this invention. He receives a scheduled service every morning that gives him the traffic updates on his way to work. Blackbird includes links to VPages of cab companies or pages that can dynamically generate new routes. Jack is in his car, when he receives a call from his proactive intelligence agent, which notifies him of a traffic jam on his way to work and tells him that he can connect to Blackbird to look into alternative roots. Jack dials into the local Blackbird traffic page. The dialog may be as follows:

Blackbird: Hello Jack. Currently, there is heavy traffic on Route 7 West due to an accident. Would you like to look into another way of getting to work?

Jack: Yes.

Blackbird: Take Route 66 from your house in Ballston to exit 64. Route 66 is moderately congested. Then take 495 North to Tysons Corner. 495 is clear. Then right on Route 7 East till Tycon Towers. Would you want to hear an alternative way?

Jack: No, thanks.

Blackbird: Would you like to find out more about the accident?

Jack: Yes.

Blackbird: A bus and cab were involved in the accident that took place at 8.05 am on Leesberg Pike. Two people were seriously injured. Congestion along 2 miles due to the accident . . . .

Jack not only receives information about the traffic jam on his way to work but also a solution to this problem, namely another route that he can take to work as well as the details of the accident that caused the traffic jam. The ease of dynamic updates facilitates dynamic content maintenance and changes in links from the traffic voice page to a news voice page. This is a great example of how proactive and reactive intelligence systems leverage each other. If Jack had not heard from his proactive intelligence agent about the traffic jam, he would take his usual route without having to check for traffic in the VNAP system. Once he receives a warning, the VNAP system provides him with all the answers he needs.

The state traffic control provides the content that Jack accesses. Given a departure point and a destination, the content lists two or three pre-programmed routes that may be used to get from the departure point to the destination. These routes may comprise a combination of streets and highways that may take Jack from point A to point B. Since Jack already put in the information on his house and work locations during subscription, the traffic page automatically informs him on alternative routes along with the associated traffic parameters. The VNAP system enables the establishment of an absolutely efficient traffic system that allows drivers to change their routes before they enter a congestion zone. By providing this service to its citizens, the government or other traffic content provider secures the welfare of commuters and maximizes the safety and efficiency of traffic flow.

In another example, when Jack does his yearly health check up, he is given a VCode that he connects to within 24 hours to find out about the results of his tests as well as to set up an appointment with a doctor to discuss these results. The VNAP system includes links to different physician's voice pages. Jack is not very happy about his cholesterol level and would like to see a cardiologist to understand the implications of this. He can hear reviews and biographies about all cardiologists on this page and setup an appointment by connecting to their voice pages. This way Jack does not have to wait impatiently to pick the results up and depending on what part of the test results he is worried about, he can be introduced to all the cardiologists that belong to this particular hospital.

The VNAP system of the present invention thus provides for various types of interactions including: (1) non-personalized—static data—no transaction (Boy Scout leader example below); (2) non-personalized—static data—data transfer (Galileo restaurant example); (3) non-personalized—static data—transaction (National Museum of Natural History example); (4) personalized—static data—transaction (MoviePhone example); (5) personalized—dynamic data—no transaction (traffic updates example); and (6) personalized—dynamic data—transaction (stock quotes example). Examples of this type of interaction are provided below.

Galileo restaurant example
1. User calls in to system and is authenticated.
2. User enters VCode associated with Galileo restaurant.
3. User presented with Galileo's main menu. Choices include: "about Galileo," "driving directions," "make a reservation," "sign the guest book." User selects "driving directions."
4. User is presented with three options: "from the northwest," "from the east," and "from Virginia." User selects "from Virginia."
5. User receives directions to 1110 21 st St., NW, and is returned to the main menu. User selects "make a reservation."
6. User prompted to enter time. If space is available, his name and number is confirmed:
   1. Will this be in the name of "Tiger Yu" or other?
   2. Is your telephone "703-703-7030," "123-123-1234," or other?
7. Reservation confirmed; user returned to the main menu. User selects "sign the guest book."
8. System confirms name and address:
   1. Will this be in the name of "Tiger Yu" or other?
   2. User selects other; prompted to input a new name.
   3. Will this be at the address of "123 Route 123" or other?
   4. User selects other; prompted to input a new address.
9. Guest book signing confirmed; user returned to the main menu. User selects "about Galileo."
10. System begins to talk about Galileo, but user interrupts by entering in the VCode for Cornelius Talmage (see above).

Personal VPage Example:
1. User calls in to system and is authenticated.
2. User enters VCode associated with Cornelius Talmage
3. User presented with the Cornelius Talmage voice page main menu. Options include "contact Cornelius" and "what are his interests"
4. User subsequently navigates the static menu structure, learning more and more about Cornelius.
5. After hearing Cornelius' interests, the user hangs up.

National Museum of Natural History example
1. User calls in to system. Authentication is conducted.
2. User enters VCode associated with the Smithsonian Natural History Museum
3. User presented with main menu, instructed to either enter an exhibit number (from a sign in the museum; possibly a VCode) or choose from a (perhaps hierarchical) list. User elects "O. Orkin Insect Zoo, bumblebees" from the list of options.
4. User presented with the bumblebee exhibit menu. Options include "hear more about bumblebees" and "buy a book on bumblebees." User selects the former.
5. User hears about bumblebees for a minute or so. User looped back to the bumblebee menu. User selects to buy the book.
6. User presented with a transactional menu. After prompting for details such as quantity and shipping method, It confirms the name, credit card and shipping address:
   1. Will this be in the name of "Buck Swope?"
   2. Would you like to use credit card "First USA Visa," "American Express Optima," or "other?"
   3. Would you like to use shipping address "1705 Q St., NW," other shipping address, or pick the book up at the front?
7. The user has just bought a book about bumblebees.

MoviePhone example:
1. User calls in to system and is authenticated.
2. User enters VCode associated with MoviePhone.
3. User asked to browse by theater or title. User elects to browse by theater.
4. Usual ZIP code is confirmed: Would you like to use ZIP code "20037" or other?
5. User presented with a list of nearby theaters to select from. User selects "Cineplex Odeon Union Station 9."
6. User presented with a list of titles. User selects "The Mummy."
7. User presented with a list of showtimes. User selects "7:01 pm."
8. User asked how many tickets he or she would like to purchase, and selects "3."
9. It confirms the credit card: Would you like to use credit card "MBNA International MasterCard" or "other?"
10. The user has just bought tickets to The Mummy.

Traffic updates example.
1. User enters traffic VCode
2. As it is after noon, the system gives the personalized evening commute: "Hello, Mr. Sparkle. Interstate 66 is <congested>. US 50 is <heavy traffic>. Chain Bridge Road is <moderate traffic>. Frederick Scott Key Bridge is <clear>. Roosevelt Bridge is <heavy traffic>. Arlington Memorial Bridge is <moderate traffic>. Rock Creek Parkway is <clear>."
3. User is presented with options including "new road." User selects "new road."
4. ZIP code confirmed: Would you like to use "20007" or other?
5. Other is selected, and the user is prompted for a new zip code. User enters 20817.
6. User is presented with a list of possible roads: "Valid roads in your vicinity are: Beltway, Clara Barton Parkway, Wisconsin Ave., Bethesda, Wisconsin Ave., DC, Connecticut Ave., Beltway Area, Connecticut Ave., DC."
7. User selects Beltway, and hears "<moderate traffic>".

Stock Quotes example:
1. User is connected to system (has already authenticated himself and is browsing other audio content).
2. User interrupts and enters the VCode for Yahoo! finance.
3. Yahoo! finance greets user with his personalized page: "Hello, Tiger! MicroStrategy, Incorporated is up 51¾ to 93¼. Leftorium Enterprises is down 7½ to 42. Your overall portfolio is up 0.78%."
4. Options presented to the user include "learn more about MicroStrategy, Incorporated," "learn more about Leftorium Enterprises," "get another quote," and "buy stock." User selects "get another quote."
5. User prompted for input. In some manner (DTMF, ASR), he or she enters "T."
6. User receives quote for AT&T: "AT&T is up 4 to 9½."
7. Options presented include "learn more about AT&T," "get a new quote," or "go back to your personalized profile." User selects "learn more."

8. User receives a detailed synopsis of AT&T's stock—highs, lows, 52- and 26-week trends, dividend yields, price/earnings ratios—everything from the cracks and vents of money analysis. Options to learn more follow, including "hear about AT&T according to Bob Smith" and "hear more about AT&T according to Merrill Lynch."
9. User selects to hear more according to ML, and is taken via link to voice content on ML's site.
10. User becomes bored with all the financial mumbo-jumbo and uses the "back" command.
11. User back on the Yahoo! finance AT&T Vpage. One more "back" and he's at his personalized stock welcome page.
12. This time the user selects "buy stock."
13. The user is prompted for the ticker symbol, and enters "T."
14. The system asks if the user might want to learn more before making the buy. As the user knows all he needs to, he bypasses this and goes straight to the transaction page.
15. A variety of options are presented: "buy common stock," "put option," or "call option."
16. User selects the basic "buy common stock" and gets the standard transactional questions/prompts: Quantity?
Is the $15 transaction charge ok? Shall we use your "America's Choice" or "Plutonium" card?

Other examples of how VCodes may be used are as follows. Exit signs on the interstate may have a VCode associated therewith. A user desiring to find out information about what hotels, restaurants, gas stations and other places of interest exist at a particular exit may call the VNAP and input the VCode associated with the exit to find out such information. It may enable advanced ordering of food at restaurants along the exit to expedite the user's travels while on the road. It may enable a user to check availability and price of hotel rooms at that exit and make a reservation during the same phone call.

Additionally, an on line voice auction could be conducted using the invention by assigning each good within the auction site a VCode and enabling the user to bid on a particular auction piece using the VCode. The user could either be viewing the auction pieces on line through the internet, could be actually present at the auction or watching the auction via television.

Additionally, VCodes may be assigned based on country or language as well so that users to the Washington Monument VCode, for example, there may be one code for Japanese, one code for English, one code for Spanish, one code for French, and another code for German.

The VCodes associated with these and other examples could be placed on the object of interest, near the object of interest, could be published about the object of interest, or displayed by a host through any means so that users can associate the VCode with a object, subject or location about which they may want to obtain information. For example, in the Washington Monument example, a user desiring to find out what restaurants are located near the Washington Monument is more likely to be willing to pay for information when the user is at the Washington Monument. Accordingly, a sign near the Washington Monument may advertise the VNAP and list the VCode associated with the Washington Monument. The user could then use a telephone or a mobile phone to call the number, input the VCode and find out what restaurants are nearby. The timeliness of that information makes the information significantly more valuable because it is delivered on demand at the located desired and in the manner requested. In these and other cases the VNAP may charge the restaurant (or other entity that posts information) for advertising its existence instead of fee sharing. On other instances, a VNAP may offer such advertisement for free to the restaurant to encourage the restaurant to post information to the VNAP's VCode system.

This technology permits the VNAP to create a powerful new business model whereby the VNAP permits others to create information that is "controlled" by the VNAP, so that the VNAP may charge users for access to information or other content. In some cases the VNAP may share a portion of the revenue or in other cases, the VNAP may actually charge the entity that posts the information. The VNAP can generate additional revenue by permitting VAds, by linking users to other VNAPs or VPages, by processing transactions or taking a percentage of transactions that result from its system even if processed by another transaction processor. Additionally, the VNAP can collect transaction data and historical use data pertaining to users who access the VCodes system. This data can be mined and used to create other value to the VNAP in other ways. The VNAP (or designated organization) can charge a registration fee for content providers to register a VCode. The VNAP can charge users a subscription fee for some or all content and attempt to obtain additional revenue from subscribers through premium VCode services and transactions. Numerous other business advantages and possibilities will be readily available.

Other embodiments and uses of the invention will be apparent to those skilled in the art from consideration of the specification and practice of the invention disclosed herein. The specification and examples should be considered exemplary only.

What is claimed is:

1. A multiple voice network access provider system for providing audible content associated with a subject through the use of voice codes, the system comprising:
   one or more storage means for storing voice pages at an identifiable location in the system; and
   a plurality of voice network access provider systems, each voice network access provider system comprising:
      means for receiving a request for a voice page through input of a voice code publicly displayed in proximity to the subject of the voice page;
      retrieval means for retrieving the voice page associated with the voice code; and
      delivery means for delivering one or more voice pages associated with the voice code input by the user.

2. The system of claim 1 further comprising a voice code registration system that assigns each voice page of content a voice code that is unique to that voice page within the entire system.

3. The system of claim 2 further comprising means for storing an association between the voice code for a voice page and the identifiable location of that voice page.

4. The system of claim 2 wherein each voice network access provider system comprises a voice code identification module to identify the voice page corresponding to a voice code input by a user.

5. The system of claim 4 further comprising a voice code resolution system that resolves the identification of a voice page if the voice code identification module is unable to do so.

6. The system of claim 5 wherein the voice code resolution system cooperates with the voice code registration system to identify the location of the voice page corresponding to the requested voice code.

7. The system of claim 1 wherein the means for receiving a request comprises a telephone system for that VNAP that enables users of that VNAP to input a voice code over a telephony device.

8. The system of claim 7 wherein the voice code is input by a user generating a verbal description.

9. The system of claim 8 wherein the verbal description relates to the voice code.

10. The system of claim 1 wherein each voice network access provider system comprises a means for recording voice pages and storing those pages.

11. The system of claim 1 wherein a voice page is stored as an Telecaster Markup Language (TML) file.

12. The system of claim 11 wherein each voice network access provider system comprises a XML-based voice content interpretation module that converts the Extensible Markup Language (XML)-based voice page to voice for the delivery means.

13. The system of claim 1 wherein the voice code assigned comprises a VNAP identification portion identifying the VNAP for the voice page and a voice page identification portion.

14. The system of claim 1 wherein a user calls into a voice network access provider and may access any voice page provided in the system through the use of a voice code for that voice page.

15. A method for providing audible content associated with a subject through the use of voice codes associated with voice pages of content comprising the steps of:

storing voice pages at an identifiable location in a multiple voice network access provider system; and providing a plurality of voice network access provider (VNAP) systems, each voice network access provider system enabling users to request voice pages and delivering one or more voice pages associated with the voice code input by the user;

wherein the voice codes are publicly displayed in proximity to the subject of the voice page.

16. The method of claim 15 further comprising the step of registering each voice page with a voice code registration system that assigns each voice page of content a voice code that is unique to that voice page within the entire system.

17. The method of claim 15 further comprising the step of storing an association between the voice code for a voice page and the identifiable location of that voice page.

18. The method of claim 15 wherein the VNAP identifies the voice page using the voice code input by the user internally.

19. The method of claim 15 wherein the VNAP identifies the voice page using the voice code through a voice code resolution system.

20. The method of claim 15 wherein the voice code is input by a user generating a verbal description.

21. The method of claim 20 wherein the verbal description relates to the voice code.

22. The method of claim 15 wherein each voice network access provider system enables a user to record voice pages to be provided to users on the system.

23. The method of claim 15 wherein each voice network access provider may enable one or more content providers to deliver, register and store voice pages for delivery to users of the system.

24. The method of claim 15 wherein the voice code assigned comprises a VNAP identification portion identifying the VNAP for the voice page and a voice page identification portion.

25. The method of claim 15 wherein a user calls into a voice network access provider and may access any voice page provided in the system through the use of a voice code for that voice page.

26. A multiple voice network access provider system for providing audible content associated with a subject through the use of voice codes, the system comprising:

one or more storage means for storing voice pages at an identifiable location in the system; and a first voice network access provider system comprising:
means for receiving a request for a voice page through input of a voice code publicly displayed in proximity to the subject of the voice page;
means for retrieving that voice page requested through a second voice network access provider; and
delivery means for delivering one or more voice pages associated with the voice code input by the user.

27. A multiple voice network access provider system for providing audible content associated with a subject through the use of voice codes, the system comprising:

one or more storage means for storing voice pages at an identifiable location in the system; and a first voice network access provider system comprising:
means for receiving a request from a user for a voice page through input of a voice code publicly displayed in proximity to the subject of the voice page; and
means for contacting a second voice network access provider to have the second voice network access provider provide the requested voice page to the user, and wherein the second voice network access provider comprises:
means for receiving a request for a voice page retrieving that voice page requested; and
delivery means for delivering one or more voice pages associated with the voice code input by the user.

28. A method for providing audible content associated with a subject through the use of voice codes associated with voice pages of content comprising the steps of:

storing voice pages at an identifiable location in a multiple voice network access provider system; and providing a plurality of voice network access provider (VNAP) systems, each voice network access provider system enabling users to request voice pages and delivering one or more voice pages associated with the voice code input by the user; wherein the voice codes are publicly displayed in proximity to the subject of the voice page, enabling users to request a voice page through input of a voice page to a VNAP; and providing the voice page to the user.

29. The method of claim 28 wherein the step of providing comprises transferring the request from one VNAP to a second VNAP that provides the voice page to the user.

* * * * *